United States Patent
Keller et al.

(10) Patent No.: US 8,543,954 B1
(45) Date of Patent: Sep. 24, 2013

(54) CONCURRENT NOISE AND DELAY MODELING OF CIRCUIT STAGES FOR STATIC TIMING ANALYSIS OF INTEGRATED CIRCUIT DESIGNS

(75) Inventors: Igor Keller, Pleasanton, CA (US); Vinod Kariat, Sunnyvale, CA (US); King Ho Tam, Milpitas, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 595 days.

(21) Appl. No.: 12/203,115

(22) Filed: Sep. 2, 2008

Related U.S. Application Data

(60) Provisional application No. 60/969,580, filed on Aug. 31, 2007.

(51) Int. Cl.
G06F 17/50 (2006.01)
G06F 17/10 (2006.01)

(52) U.S. Cl.
USPC ........... 716/115; 716/106; 716/108; 716/111; 716/113; 716/124; 716/132; 716/134; 716/136; 703/2; 703/14; 703/15

(58) Field of Classification Search
USPC ................. 716/106, 108, 111, 115, 124, 132, 716/134, 136; 703/2, 14, 15
See application file for complete search history.

(56) References Cited

U.S. PATENT DOCUMENTS

| | | | |
|---|---|---|---|
| 5,025,402 A | 6/1991 | Winkelstein | |
| 5,553,008 A | 9/1996 | Huang et al. | |
| 6,378,109 B1 * | 4/2002 | Young et al. | 716/115 |
| 6,405,348 B1 | 6/2002 | Fallah-Tehrani et al. | |
| 6,721,929 B2 | 4/2004 | Li et al. | |
| 6,941,258 B2 | 9/2005 | Van Heijningen et al. | |
| 6,971,076 B2 * | 11/2005 | Chen | 716/115 |
| 7,050,388 B2 * | 5/2006 | Kim et al. | 370/201 |
| 7,073,140 B1 * | 7/2006 | Li et al. | 716/115 |
| 7,158,920 B2 * | 1/2007 | Ishikawa | 702/191 |
| 7,359,843 B1 * | 4/2008 | Keller et al. | 703/2 |

(Continued)

OTHER PUBLICATIONS

Keller et al.; "A robust cell-level crosstalk delay change analysis"; Publication Year: 2004; Computer Aided Design, 2004. ICCAD-2004. IEEE/ACM International Conference on; pp. 147-154.*

Li et al.; "A Waveform Independent Gate Model for Accurate Timing Analysis"; Proceedings of the 2005 International Conference on Computer Design (ICCD'05); Publication Year 2005; pp. 363-365.

(Continued)

*Primary Examiner* — Helen Rossoshek
(74) *Attorney, Agent, or Firm* — Alford Law Group, Inc.

(57) ABSTRACT

Systems, apparatus, and methods of static timing analysis for an integrated circuit design in the presence of noise are disclosed. The integrated circuit design undergoing analysis may be partitioned into a plurality of subcircuit stages. Each subcircuit stage in the integrated circuit design may be modeled to include a model of at least one victim driver, at least one aggressor driver, at least one receiver, and an interconnect network. Associated with each subcircuit stage is a set of related edges of a design graph to compute signal propagation delay. For each subcircuit stage, full timing delays of each edge can be concurrently computed. This includes concurrently computing base timing delays for a nominal response to the at least one victim driver and the interconnect network and noise related timing delays in response to the at least one aggressor driver and the interconnect network.

28 Claims, 28 Drawing Sheets

(56) References Cited

U.S. PATENT DOCUMENTS

| | | | |
|---|---|---|---|
| 7,383,522 B2* | 6/2008 | Murgai et al. | 716/113 |
| 7,469,391 B2* | 12/2008 | Carrere et al. | 716/115 |
| 7,549,134 B1* | 6/2009 | Li et al. | 716/115 |
| 7,562,323 B1* | 7/2009 | Bai et al. | 716/115 |
| 7,653,524 B2 | 1/2010 | Li et al. | |
| 7,720,654 B2 | 5/2010 | Hollis | |
| 7,761,275 B2* | 7/2010 | Chopra et al. | 703/14 |
| 7,804,760 B2* | 9/2010 | Schmukler et al. | 370/201 |
| 7,882,466 B2* | 2/2011 | Ishikawa | 716/136 |
| 7,890,915 B2* | 2/2011 | Celik et al. | 716/113 |
| 8,205,181 B1* | 6/2012 | Singla et al. | 716/113 |

OTHER PUBLICATIONS

Dabas et al; "Automated Extraction of Accurate Delay/Timing Macromodels of Digital Gates and Latches using Trajectory Piecewise Methods"; Design Automation Conference, 2007. ASP-DAC '07. Asia and South Pacific; Jan. 23-26, 2007; pp. 361-366.

Croix et al; "Blade and razor: cell and interconnect delay analysis using current-based models"; Proceedings of Design Automation Conference, 2003; Jun. 2-6, 2003; pp. 386-389.

Office Action—Apr. 17, 2012; U.S. Appl. No. 11/849,254; Naum Levin; 9 pages.

* cited by examiner

|   | $\tau_\sigma$ | $T_\sigma$ |
|---|---|---|
| $\sigma_{REF}$ | $\tau_{REF}$ | $T_{REF}$ |
| $\sigma_{FAST}$ | $\tau_{FAST}$ | $T_{FAST}$ |
| $\sigma_{SLOW}$ | $\tau_{SLOW}$ | $T_{SLOW}$ |

FIG. 11

| $v$ | 0 | $v_1$ | $v_2$ | ... | 1 |
|---|---|---|---|---|---|
| $\sigma_{REF}$ | $F_{\sigma_{REF}}(0)$ | $F_{\sigma_{REF}}(v_1)$ | $F_{\sigma_{REF}}(v_2)$ | ... | $F_{\sigma_{REF}}(1)$ |
| $\sigma_{FAST}$ | $F_{\sigma_{FAST}}(0)$ | $F_{\sigma_{FAST}}(v_1)$ | $F_{\sigma_{FAST}}(v_2)$ | ... | $F_{\sigma_{FAST}}(1)$ |
| $\sigma_{SLOW}$ | $F_{\sigma_{SLOW}}(0)$ | $F_{\sigma_{SLOW}}(v_1)$ | $F_{\sigma_{SLOW}}(v_2)$ | ... | $F_{\sigma_{SLOW}}(1)$ |

FIG. 12

| $V_c(t)/V_o$ | $V_{o_0}$ | $V_{o_1}$ | $V_{o_2}$ | $V_{o_3}$ | ··· | $V_{o_P}$ |
|---|---|---|---|---|---|---|
| $V_{c(0)}$ | $I_{0,0}$ | $I_{0,1}$ | $I_{0,2}$ | $I_{0,3}$ | ··· | $I_{0,P}$ |
| $V_{c(1)}$ | $I_{1,0}$ | $I_{1,1}$ | $I_{1,2}$ | $I_{1,3}$ | ··· | $I_{1,P}$ |
| $V_{c(2)}$ | $I_{2,0}$ | $I_{2,1}$ | $I_{2,2}$ | | ··· | $I_{2,P}$ |
| $V_{c(3)}$ | $I_{3,0}$ | $I_{3,1}$ | $I_{3,2}$ | | ··· | $I_{3,P}$ |
| ⋮ | ⋮ | | | | | |
| $V_{c_Q}$ | $I_{Q_0}$ | $I_{Q_1}$ | $I_{Q_2}$ | | ··· | $I_{Q_P}$ |

*FIG. 13*

| $V_o$ | $C_g$ |
|---|---|
| $V_{o_0}$ | $C_{g_0}$ |
| $V_{o_1}$ | $C_{g_1}$ |
| $V_{o_2}$ | $C_{g_2}$ |
| ⋮ | ⋮ |
| $V_{o_P}$ | $C_{g_P}$ |

*FIG. 14*

| u (measured @ current l) / σ | $u_1(@l_1)$ | ... | $u_i(@l_i)$ | $u_{i+1}(@l_{i+1})$ | ... |
|---|---|---|---|---|---|
| $\sigma_1$ | $Y_1$ | ... | $Y_i$ | $Y_{i+1}$ | ... |
| $\sigma_2$ | $Z_2$ | ... | $Z_i$ | $Z_{i+1}$ | ... |
| $\sigma_0$ | $X_1$ | ... | $X_i$ | $X_{i+1}$ | ... |

FIG. 15

CONCURRENT NOISE AND DELAY MODELING OF CIRCUIT STAGES FOR STATIC TIMING ANALYSIS OF INTEGRATED CIRCUIT DESIGNS

CROSS REFERENCE TO RELATED APPLICATIONS

This non-provisional United States (U.S.) patent application claims the benefit of provisional U.S. patent application Ser. No. 60/969,580 filed on Aug. 31, 2007 by inventors, Vinod Kariat et al., entitled CONCURRENT SENSITIVITY, NOISE, AND STATIC TIMING ANALYSIS FOR INTEGRATED CIRCUIT DESIGNS USING A MULTI-CCC CURRENT SOURCE MODEL, and is incorporated in its entirety (including appendices) herein by reference.

FIELD

The embodiments of the invention relate generally to integrated circuit design software tools, such as static timing analysis software tools and signal integrity analysis software tools for designing integrated circuits.

BACKGROUND

Electronic computer aided design (ECAD) software tools for static timing analysis (STA) may be used to estimate timing delays in an electronic circuit, such as electronic circuits that are found in integrated circuits. However, process technology has improved so that smaller transistor channels of 65 nano-meters (nm) and 45 nm have become available. With smaller transistor channels, there is an increased need for more accurate timing analysis. Additionally with the smaller geometries there may be a number of unknown effects to electronic signal propagation that may be considered, which may not have been as severe with more relaxed process technology nodes.

BRIEF SUMMARY

The embodiments of the invention are best summarized by the claims that follow below.

Briefly however, in accordance with one embodiment of the invention, an integrated circuit design undergoing analysis may be partitioned into a plurality of subcircuit stages. Each subcircuit stage in the integrated circuit design may be modeled to include a model of at least one victim driver, at least one aggressor driver, at least one receiver, and an interconnect network. Associated with each subcircuit stage is a set of related edges of a design graph to compute signal propagation delay. For each subcircuit stage, full timing delays of each edge can be concurrently computed. This includes concurrently computing base timing delays for a nominal response to the at least one victim driver and the interconnect network and noise related timing delays in response to at least one aggressor driver and the interconnect network.

BRIEF DESCRIPTIONS OF THE DRAWINGS

FIG. 11 illustrates a table storing values for $T_\sigma$ and $\tau_\sigma$ which is indexed by slew rate $\sigma$.

FIG. 12 illustrates a table storing values for $F_\sigma(V)$ which is indexed by slew rate $\sigma$ and the normalized time value $v$.

FIG. 13 illustrates a table storing values $I_o(V_c, V_o)$ which is indexed by both $V_c$ and $V_o$.

FIG. 14 illustrates a table storing values of $C_g$ which may be looked up given $V_o$.

FIG. 15 illustrates a table of equi-currents at normalized time values for time transformation of an input waveform.

DETAILED DESCRIPTION

In the following detailed description of the embodiments of the invention, numerous specific details are set forth in order to provide a thorough understanding. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Introduction

Figure 1A:
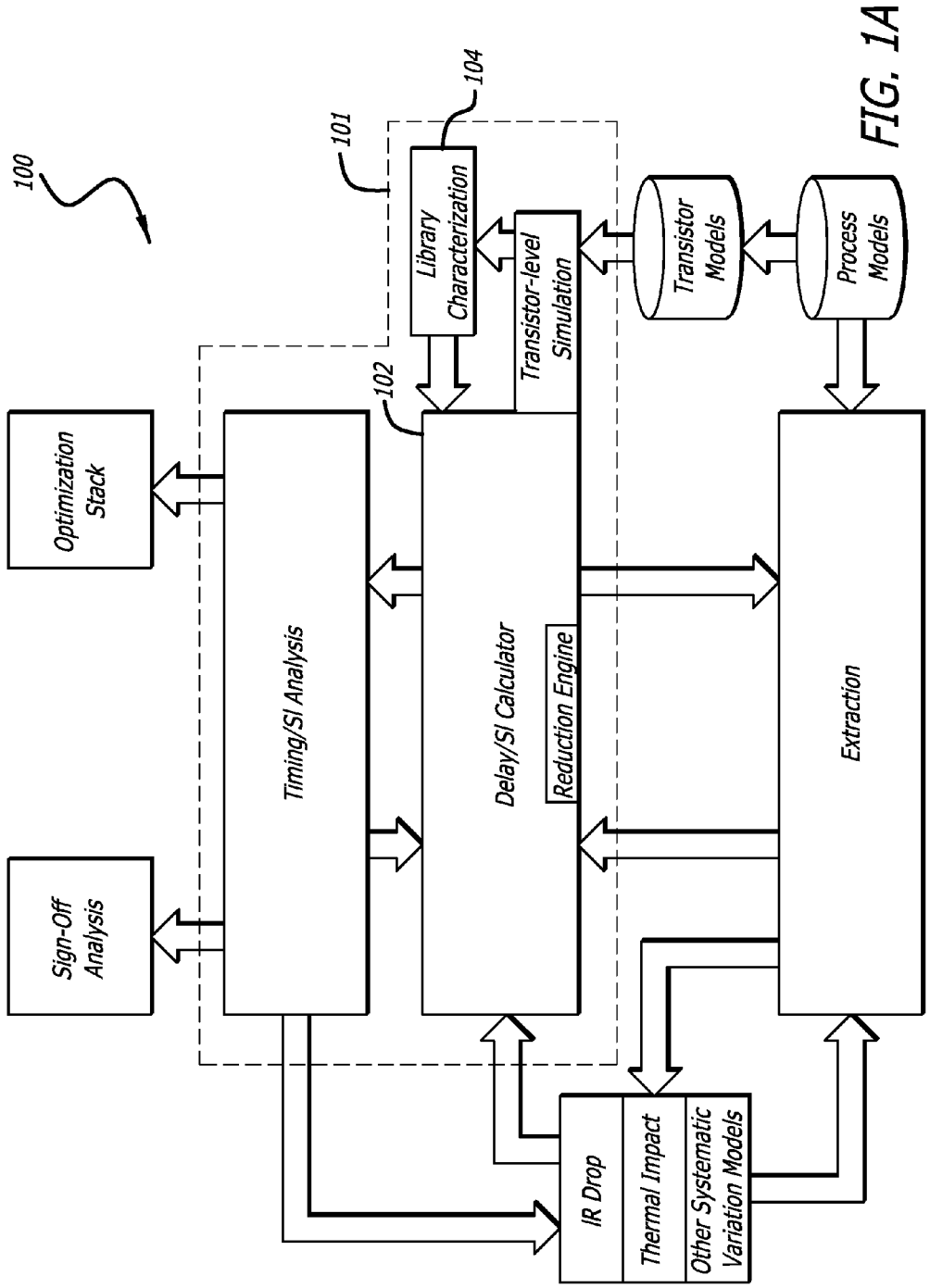
FIG. 1A is a block diagram of an integrated circuit design flow including a statistical static timing analyzer in accordance with an embodiment of the invention.

FIG. 1A illustrates an exemplary integrated circuit design flow 100 employing embodiments of the invention. Digital performance analysis software tools, such as Static Timing Analysis (STA) software tools and Signal Integrity (SI) Analysis software tools 101, are used to estimate the performance of an integrated circuit chip. As shown in FIG. 1A, these software tools may internally employ different levels of abstraction, a graph level abstraction, a net level abstraction, and a shape level abstraction.

At the graph level of abstraction, the highest level, the software tool works with the entire circuit design as a design graph. The graph level abstraction propagates quantities or metrics of interest from the inputs of the circuit design to the outputs of the circuit design. For example, an STA tool may propagate arrival times throughout the circuit design.

At the net level of abstraction, the STA software tool calculates quantities of interest for each of the nets in the design. While doing an SI analysis, an SI analysis software tool may calculate the crosstalk glitch induced on a specific net.

At the shape level of abstraction, the software tools work with information from the actual chip layout. The information may include device sizes and interconnect parasitics, for example, such as can be obtained from a parasitic extractor.

In some embodiments of the invention, an electrical calculation engine component or delay calculator 102 is provided for the net level abstraction layer of electrical analysis software tools.

Figure 1B:
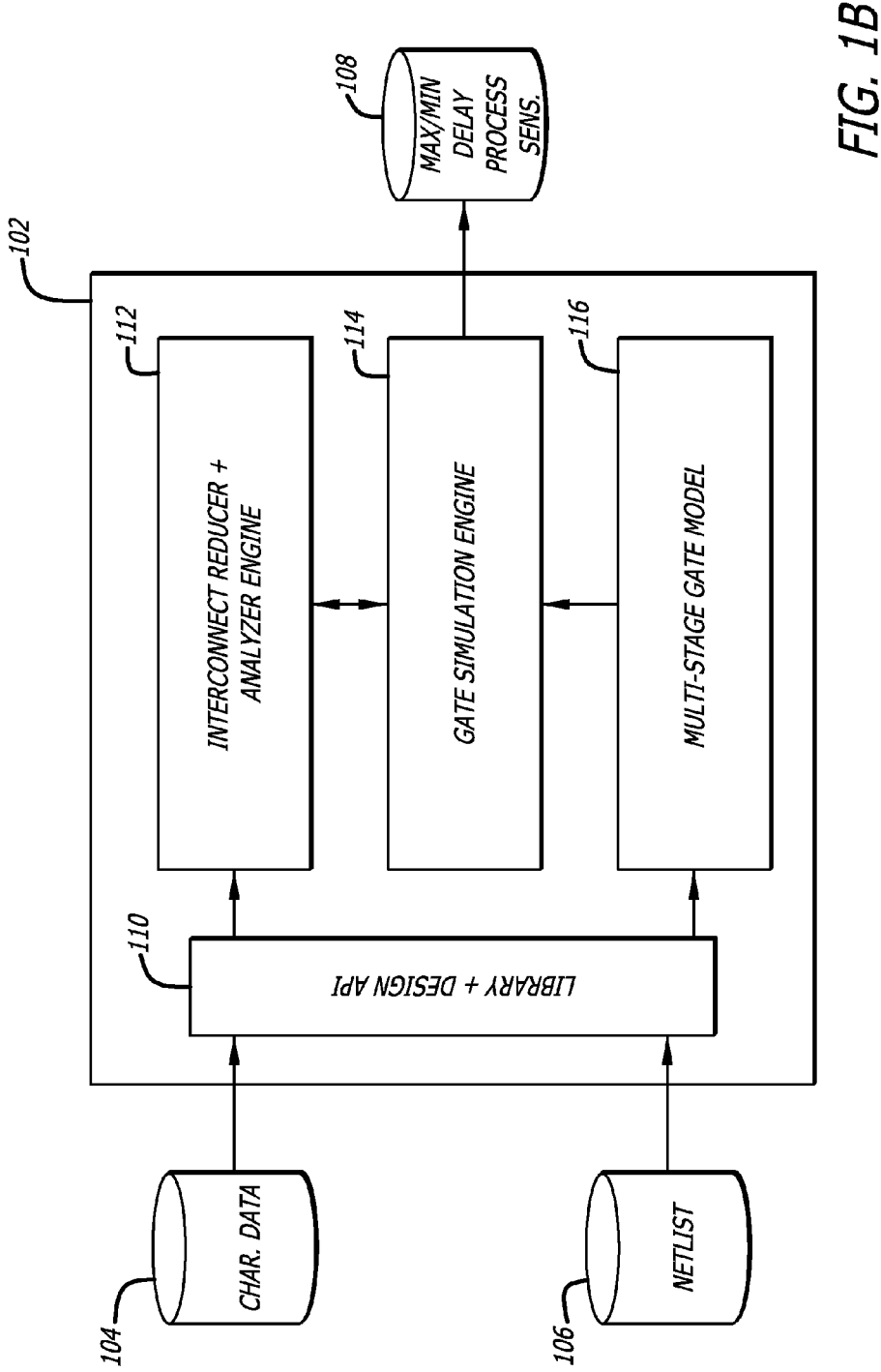
FIG. 1B is a block diagram of a multi-CCC gate delay calculator in accordance with one embodiment of the invention.

Referring now to FIG. 1B, a block diagram of a multi-CCC gate delay calculator (EOS) 102 is illustrated. The multi-CCC gate delay calculator (EOS) 102 may also be referred to herein as an electrical calculator. The delay calculator 102 receives characterization data 104 and a netlist 106 to generate timing delays 108 (e.g., max timing delay, min timing delay) including process sensitivities. The characterization data 104 may be part of a cell library of logic cells.

The delay calculator 102 includes an application programming interface (API) 110, an interconnect reducer & analysis engine 112, a gate simulation engine 114, and a multi-CCC current source model 116 coupled together as shown.

The interconnect reducer & analysis engine 112 receives the netlist 106 including a defined interconnect of standard cells to reduce it down to a simplified model for use with the gate simulation engine 114. The interconnect reduction and analysis engine 112 reduces the extracted parasitic network down to a simplified load model. Typically, the extracted parasitic network corresponding to an output net can be very large. Since only the inputs and outputs of the net need to be monitored, the interconnect network may be reduced to create a smaller, electrically equivalent representation speeding up delay calculations while preserving the input-to-output electrical behavior of the net.

The multi-CCC current source model 116, described in further detail below, receives the characterization data 104 and models single-CCC and multi-CCC standard cells in response to the type of standard cell in the netlist that is being analyzed in a given stage of a delay path. The multi-CCC current source model 116 describes the electrical behavior of a standard cell in an abstract fashion in order to speed electrical calculations, such as delay calculations and noise delay calculations, and sensitivity calculations. The parameters of the gate model are usually derived by a library characterization process, such as described below.

The gate simulation engine 114 calculates the output waveform at the output of a given gate in response to the input stimulus as well as the multi-CCC current source model 116 and its parameters. A simplified load model may be used to model the effect of the interconnect loading on the gate. A noise model may also be used to model noise from aggressors in the standard cell.

The parameters for each standard cell to fashion its corresponding gate model are typically stored in a standard cell library. The IC netlist design data is stored in some form in the host tool. One or more application programming interfaces (API) 110 interact with the library and the design data to read information there-from. Another one or more APIs 110 may be used by graph level engines, operating at the graph level on the netlist to determine delays along data paths for example, to call the delay calculator 110 and obtain the timing results of the calculations at each gate along a graphed path.

A current source model for a multi-CCC structure described below may be used for both delay and SI calculations. Thus, a single characterization process may yield a gate model for both delay and SI calculations.

Figure 1C:
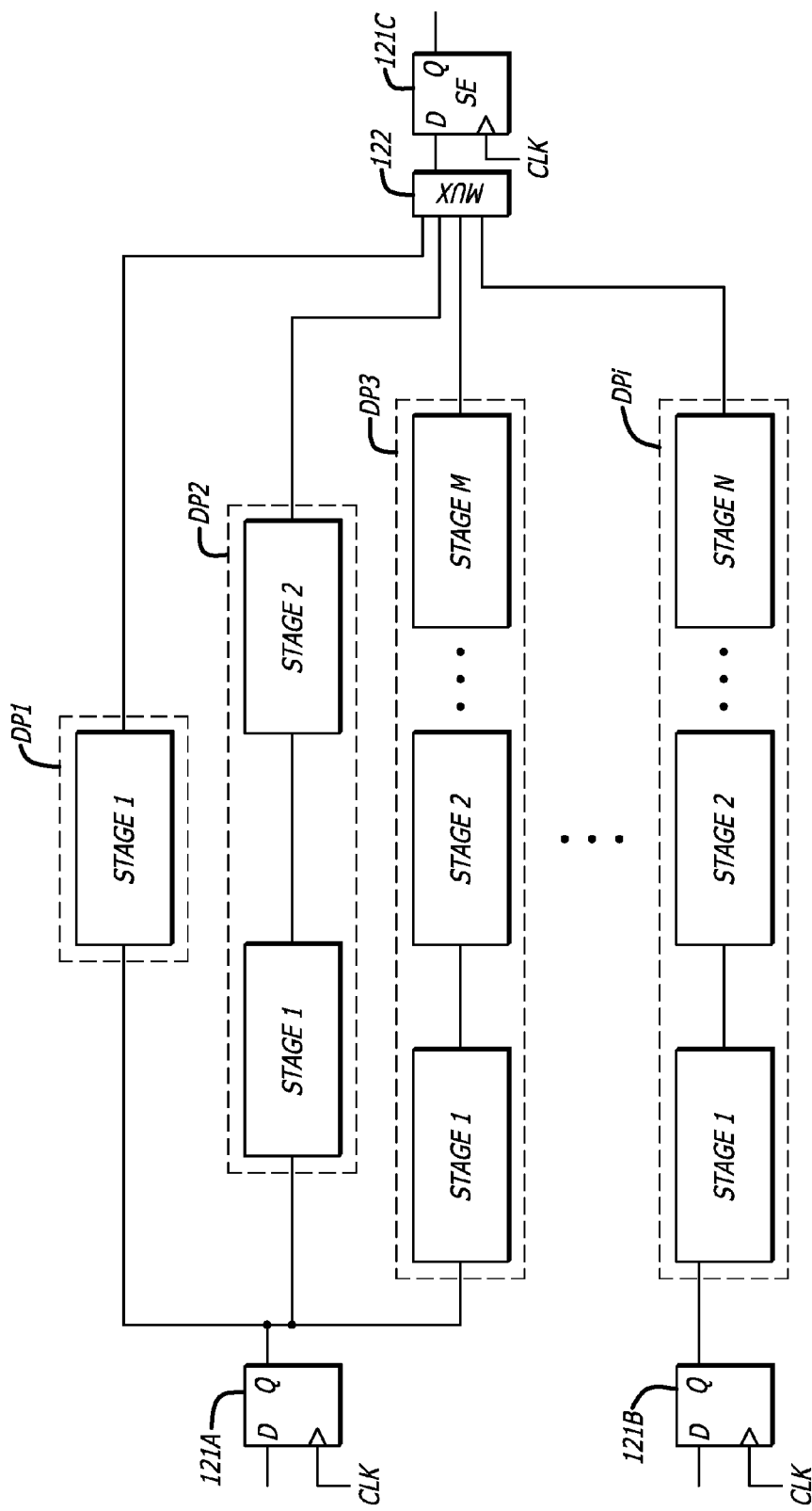
FIG. 1C is a block diagram of a portion of an exemplary netlist with stages of standard cells along delay paths between flip flops.

FIG. 1C illustrates a block diagram of a portion of an exemplary netlist including a plurality of delay paths DP1-DPi from D flip-flops/latches/registers 121A-121B multiplexed into a D flip-flop/latch/register 121C by a multiplexer 122. The delay calculator 102 may be used to compute the timing delays through the delay paths between the D flip-flops/latches/registers 121A-121B and the D flip-flop/latch/register 121C.

The delay paths DP1-DPi may have various stages of single-CCC and multi-CCC standard cells. A first delay path DP1 includes a single stage Stage1. A second delay path DP2 includes two stages, Stage1 and Stage2. A third delay path DP3 includes M stages, Stage1 through StageM. An $i^{th}$ delay path Dpi includes N stages, Stage1 through StageN.

Figure 1D:
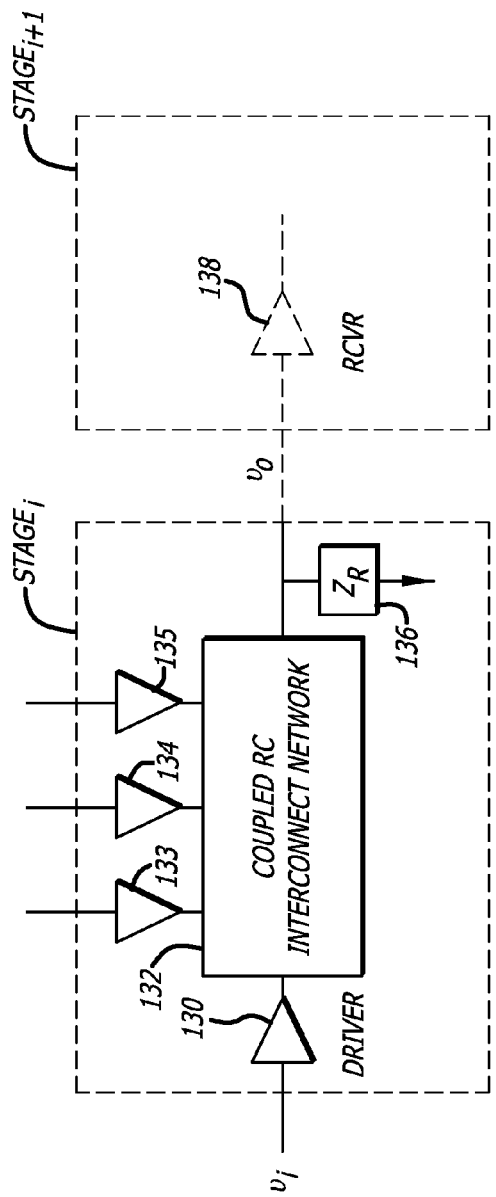
FIG. 1D illustrates an exemplary pair of stages of standard cells coupled together.

FIG. 1D illustrates an exemplary pair of stages of standard cells, Stage(i) and Stage(i+1). The stage(i) may be modeled by a driver 130 driving a coupled RC interconnect network 132 and an load impedance Zr 136. One or more neighbor nets 133-135 may induce noise through the coupled RC interconnect network 132. A voltage source Vi representing a rising or falling transition is connected at the input of driver 130. In response to the input voltage Vi, the coupled RC interconnect network 132, and the load impedance Zr 136; the driver 130 generates an output voltage Vo at the one or more outputs of the stage(i). However, the description herein describes a model with a single output that may be readily duplicated for a standard cell with a plurality of outputs.

Figure 2B:
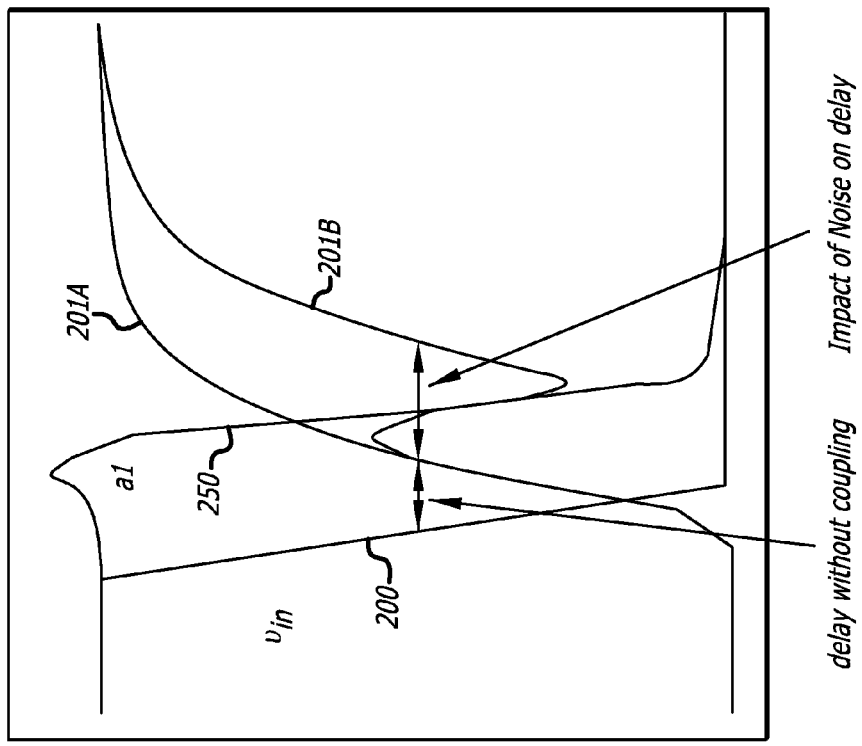
FIG. 2B are waveform diagrams to illustrated signals of the schematic diagram of FIG. 2A.
Figure 2A:
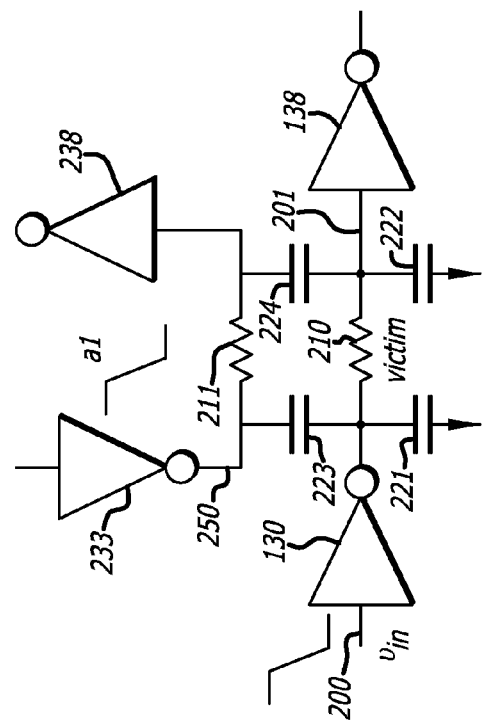
FIG. 2A is a schematic diagram of an exemplary stage of a standard cell in a netlist.

Referring now to FIG. 2A, a schematic diagram of an exemplary standard cell in a netlist is illustrated. This is the view seen by the electrical delay calculator working at a gate or net level abstraction layer. The standard cell includes a driver 130, the RC interconnect network 132 connected to the output of the driver consisting of one or more resistors 210-211 and one or more capacitors 221-224, the extracted parasitics 136 associated with the output net Vo 201 (see FIG. 1D) coupled together as shown. One or more receivers 138 are coupled to the output net Vo 201 and may add to the extracted parasitics 136. An aggressor driver 233 may generate an aggressor signal 250 coupled into the interconnect network 132. An aggressor receiver 238 may also influence the generation of the aggressor signal 250, adding additional parasitic load to the network 132.

FIG. 2B illustrates waveform diagrams 200, 250, and 201A-201B respectively of the Vin signal 200, the aggressor signal 250, and the victim or Vo output signal 201. The objective of the electrical delay calculator 102 is to calculate the waveforms at the output net Vo which is input to each of the receivers 138 of the net, and return quantities of interest about the waveform to the graph level abstraction layer. In this case, the delay calculator 102 applies the input signal Vin 200 as a stimulus when simulating the responses at the receiver inputs. For static timing analysis (STA), the quantity of interest is the timing delay from the input Vin 200 into the driving gate 130 and the output net Vo 201 that is coupled to the input of the receiver 138 in the next stage. For noise or signal integrity analysis, the quantity of interest may be the amount of crosstalk delay generated on the output net Vo 201 by the aggressor driver 233.

Without any aggressor driver 233 or when node 250 is quiet, the delay calculator 102 may generate a relatively smooth output waveform 201A on the Vo output signal 201 that has a timing delay TD0 not affected by coupling noise (or crosstalk). When aggressor driver 233 and node 250 are switching, the delay calculator 102 may generate a noisy output waveform 201B on the Vo output signal 201 that has a timing delay TDN which is affected by coupling noise that may be greater than the timing delay TD0 without coupling noise. That is, the switching of the aggressor driver 233 may cause additional delay in the signal generated by the stage on the output net Vo 201.

Models and Characterization

The multi-CCC current source model used in the delay calculator, may also be referred to herein as a ViVo II model. The multi-CCC current source model is capable of accurately supporting standard cells with both single-channel connected components (single-CCC) and multi-channel connected components (multi-CCC). Channel-connected components (CCCs) are found within standard circuit cells (or simply standard cells) of a standard cell library.

A single channel connected component (single-CCC) includes transistors connected to each other by their drain and/or source terminals between paths from the positive power supply VDD to the negative power supply VSS or ground. The boundary of a CCC is at a gate terminal or an input or output terminal of the standard cell.

Standard cells with multi-channel connected components (multi-CCCs) include a plurality of single-CCCs coupled in series together at gate terminals between inputs and outputs of the standard cell.

Figure 3B:
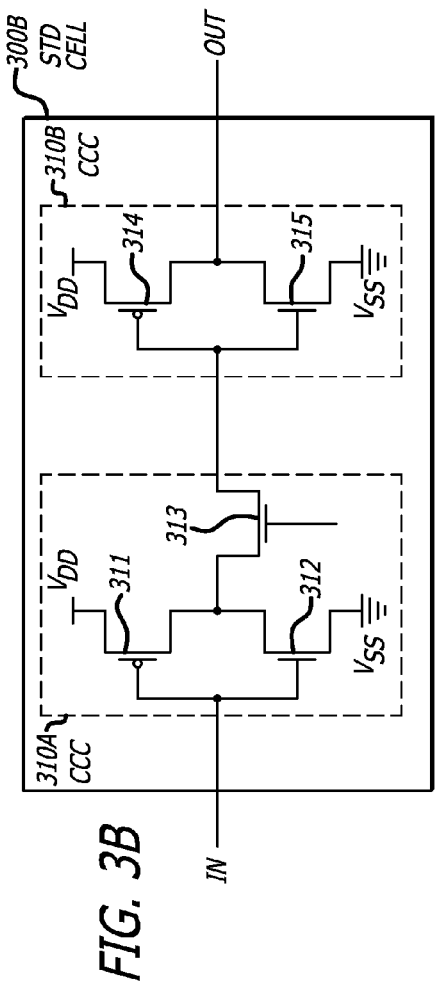
FIGS. 3A-3C are schematic diagrams of exemplary single-CCC standard cells and multi-CCC standard cells.
Figure 3C:
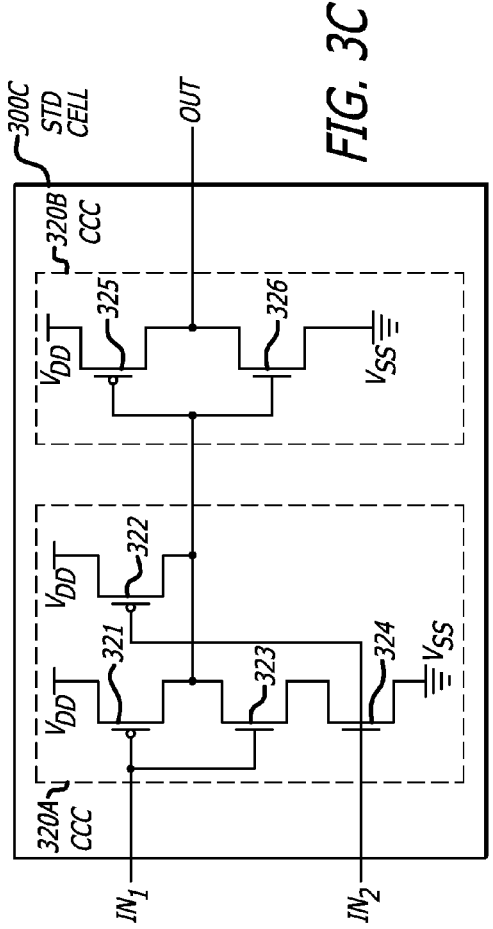
Figure 3A:
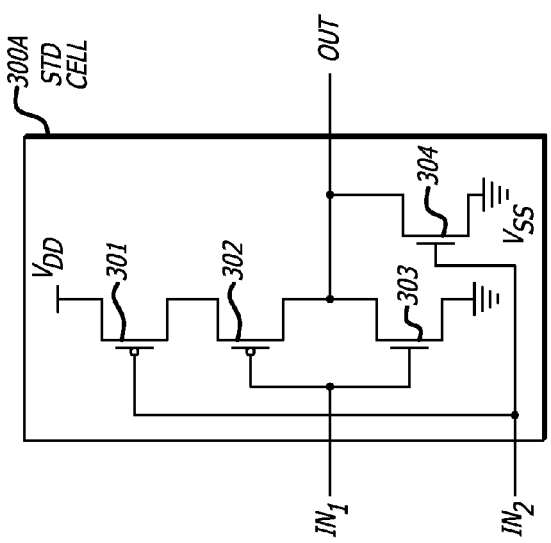

FIG. 3A illustrates an exemplary single-CCC standard cell 300A. The standard cell 300A is a NOR logic gate with sources/drains of transistors 301-304 coupled together between the positive power supply VDD and the negative power supply VSS. Standard cells for an inverter and NAND gate are also single-CCC standard cells. There are no other CCCs between the inputs IN1,IN2 and the output OUT.

FIG. 3B illustrates an exemplary multi-CCC standard cell 300B. The multi-CCC standard cell 300B includes a first single-CCC 310A and a second single-CCC 310B coupled in series together between the input IN and the output OUT of the standard cell 300B. The single-CCC 310A includes transistors 311-313. The sources/drains of transistors 311-313 are coupled together between the positive power supply VDD and the negative power supply VSS. A source or drain of transistor 313 couples to the gate terminals of transistors 314 and 315 at the boundaries of the first and second single-CCCs 310A-310B. The single-CCC 310B includes transistors 314-315. The sources/drains of transistors 314-315 are coupled together between the positive power supply VDD and the negative power supply VSS.

FIG. 3C illustrates another exemplary multi-CCC standard cell 300C. The multi-CCC standard cell 300C is an AND gate and includes a first single-CCC (NAND gate) 320A and a second single-CCC (inverter) 320B coupled in series together between the inputs IN1,IN2 and the output OUT of the standard cell 300C. The single-CCC 320A includes transistors 321-324. The sources/drains of transistors 321-324 are coupled together between the positive power supply VDD and the negative power supply VSS. The single-CCC 320B includes transistors 325-326. The sources/drains of transistors 325-326 are coupled together between the positive power supply VDD and the negative power supply VSS. Other exemplary multi-CC standard cells include a non-inverting buffer formed by a pair of inverters coupled in series together, an OR gate formed by a NOR gate coupled in series to an inverter, an exclusive-NOR (XNOR) gate formed by a pair of parallel NOR gates coupled in series to an additional NOR gate, and an exclusive-OR (XOR) gate formed by a pair of parallel NAND gates coupled in series to an additional NAND gate.

The ViVo II multi-CCC current source model (i) treats standard cells (with either single-CCCs or multi-CCS) as black boxes during characterization; (ii) compacts the model, which is independent of output load and much less dependent on the number of input slews to use during characterization; and (iii) encapsulates internal waveform distortion and internal delay in multi-CCC standard cells efficiently.

Figure 4A:
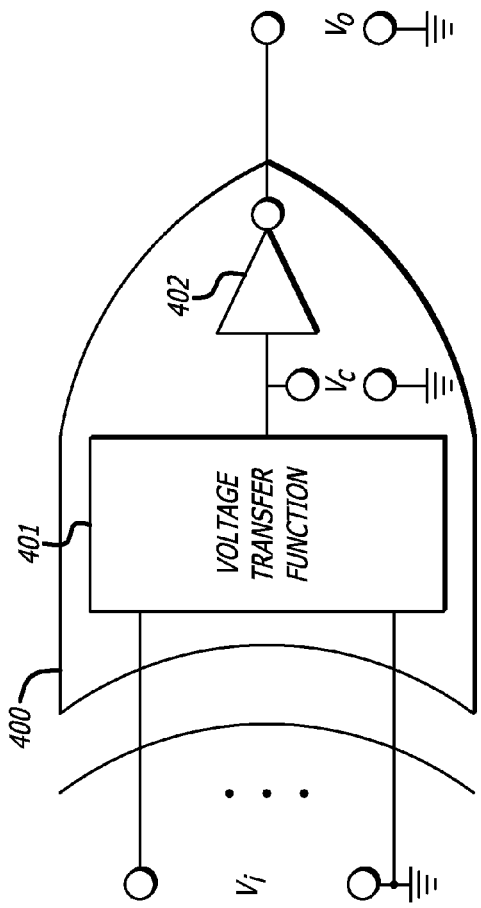
FIG. 4A illustrates an abstracted view of a multistage standard cell, such as an XOR gate.

FIG. 4A illustrates an abstracted view of a multi-CCC standard cell, such as an XOR gate 400. The exemplary XOR gate 400 may be modeled by a voltage transform function 401 to transform the input voltage $V_i(t)$ into an intermediate voltage $V_c(t)$; and a last stage or driver stage 402 to generate an output voltage Vo(t) and an output current Io(t) in response to the intermediate voltage $V_c(t)$. The voltage transform function 401 may also be referred to herein as a delay transfer function may represent one or more internal stages of a multi-CCC standard cell.

The goal of ViVo II multi-CCC current source model is to characterize the gate's driving capability and to provide a simple abstraction which captures the output current waveform in the presence of multiple internal stages. The current through a single CCC can be described accurately based on a two dimensional DC current function F(Vi(t),Vo(t)). For a multi-CCC cell the current Io(t) waveform at the output of the standard cell 400 is dictated by the instantaneous input voltage at the last CCC 402, which we denote as $V_c(t)$. Thus, the current through a multi-CCC standard cell is a function of the instantaneous input voltage at the last CCC 402 which can be denoted by $I=F(V_c(t),Vo(t))$. In order to find $V_c(t)$ from Vi(t), a waveform transfer function 401 can be used to map the input voltage transition to an intermediate voltage transition.

A multi-CCC current source model therefore may consist of two major components: (i) the dc current function modeling drawn current as a function of instantaneous input and output voltages and their time derivatives of the last CCC of the cell, and (ii) a waveform transfer function defining the waveform at the input of the last CCC as a function of the waveform at the cell's input.

A one straightforward way to construct these two parts is to perform a series of spice simulations where the node which is the input of the cell's lass CCC is directly probed or stimulated, respectively. However, while this approach is feasible, an understanding of the internal topology of the cell's circuit and a partition of the circuit into one or more CCCs must be performed. Instead, the embodiments of the invention treat a standard cell as a black box without having to understand the internal topology of a circuit and partition it into CCCs. Thus, the construction of the two components of the model is done through fitting the results of a series of spice simulations where excitation and probing points are only the standard cell's interface (e.g., input/output) pins.

ViVo II Multi-CCC Current Source Model

Figure 4B:
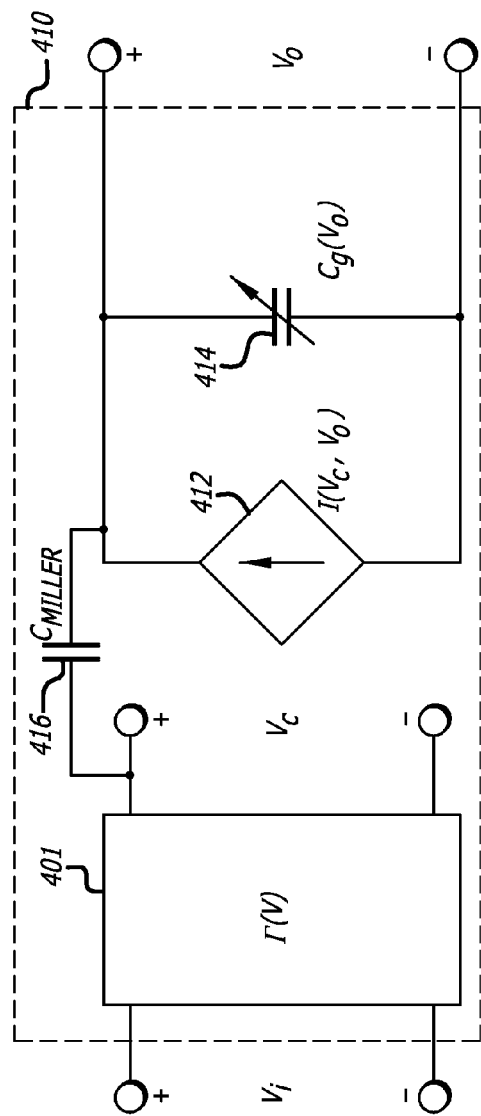
FIG. 4B illustrates a multi-CCC current source model in accordance with one embodiment of the invention.

FIG. 4B illustrates the ViVo II multi-CCC current source model 410. The multi-CCC current source model 410 includes two parts as explained in the previous section.

The first part is an internal waveform transformation function 401 which transforms the input voltage $V_i(t)$ into the intermediate voltage $V_c(t)$ by Equation 1 as follows:

$$V_c(t) = \Gamma(Vi(t)) \quad (1)$$

Note that the intermediate voltage Vc(t) models a delay and distortion of the input signal transition as it propagates through a standard cell's circuit up until the input to the last CCC. Fitting techniques may be used to map the input signal to the intermediate voltage signal $V_c(t)$.

The second part is a voltage dependent current source which characterizes the driving CCC 402. It consists of a voltage dependent current source $I=F(V_c,V_o)$ 412, which gives the driving current for any $V_c$ and $V_o$ value and their derivatives:

$$F(V_c, V_o) = F_{dc}(V_c, V_o) + C_M(V_c, V_o)\frac{d}{dt}(V_c - V_o) - C_g(V_c, V_o)\frac{d}{dt}V_o \quad (2)$$

In Equation 2, $F_{dc}$ is a DC component of the current source defining the current value based on the values $V_c$ and $V_o$. The second and third terms in Equation 2 model the dynamic current due to Miller effect from input to the output of the last CCC of the cell and output pin capacitance of the cell. The coefficients of the two latter terms are nonlinear Miller and output pin capacitances which in general depend upon voltages Vc, Vo. However, since the contribution of the last dynamic term in Eq. (2) is usually small, characterizing the $C_g$ for the initial input voltage Vi(t=0) suffices to provide sufficiently accurate results.

FIG. 5 illustrates the application of $\Gamma(V(t))$ which converts an input voltage waveform $V_i(t)$ of slew $\sigma$ into an intermediate voltage waveform $V_c(t)$ in accordance with one embodiment of the invention. In one embodiment of the invention, the transformation function $\Gamma$ which is used to generate the intermediate voltage Vc(t) in voltage transformation equation (Eq. 1) is as follows:

$$V_c(t) = \Gamma(V_i(t)) = V_i\left(\frac{T_i}{F_\sigma\left(\frac{t-\tau_\sigma}{T_\sigma}\right)} + \tau_i\right) \quad (3)$$

In Equation 3, $F_\sigma(v)$ is a normalized time transfer function (time versus time) with time normalization being defined by $$v = \frac{t-\tau_\sigma}{T_\sigma}.$$

As show by the input voltage $V_i(t)$ versus time chart of FIG. 5, $\tau_i$ and $T_i$ are respectively the starting time and the duration of the input voltage $V_i(t)$ transition from high to low. Alternatively, $\tau_i$ and $T_i$ may be the starting time and the duration of the input voltage $V_i(t)$ transition from low to high, respectively.

As shown by the intermediate voltage Vc(t) versus time chart of FIG. 5, $\tau_\sigma$ is the starting time of the transition in the intermediate voltage $V_c(t)$ and $T_\sigma$ is the transition period of the intermediate voltage $V_c(t)$.

The function $F_\sigma(v)$ captures the non-linear waveform shape change from $V_i(t)$ to $V_c(t)$. $F_\sigma(v)$, $T_\sigma$ and $\tau_\sigma$ are all functions of the slew rate $\sigma$ (change in voltage over time) of the input voltage $V_i(t)$ and are stored in tables indexed by $\sigma$. FIG. 11 illustrates an exemplary table of values for $T_\sigma$ and $\tau_\sigma$ as a function of a reference slew rate $\sigma_{ref}$, a fast slew rate $\sigma_{fast}$, and a slow slew rate $\sigma_{slow}$ of the input voltage $V_i(t)$. FIG. 12 illustrates an exemplary table of values for $F_\sigma(v)$ as a function of a reference slew rate $\sigma_{ref}$, a fast slew rate $\sigma_{fast}$, and a slow slew rate $\sigma_{slow}$ over the normalized time $v$ which varies from 0 to 1.

In its application, the multi-CCC current source model captures the slew rate $\sigma$ from the voltage input waveform $V_i(t)$, which is then used to look up the corresponding values for $T_\sigma$, $\tau_\sigma$ and $F_\sigma(V)$ from look up tables, such as the tables illustrated in FIG. 11 and FIG. 12, respectively. The model then applies the voltage transformation equation (Eq. 3) to map the voltage points on $V_i(t)$ to $V_c(t)$ to convert an input waveform $V_i(t)$ of slew rate $\sigma$ to the intermediate voltage waveform $V_c(t)$ in one embodiment of the invention. In another embodiment of the invention, a lookup table is used to convert the waveform $V_i(t)$ of slew rate $\sigma$ to the intermediate voltage waveform $V_c(t)$.

With the intermediate voltage waveform $V_c(t)$, the output current waveform may be computed by using the intermediate voltage waveform $V_c(t)$ as the dependent input of the current source model $I_o(V_c,V_o)$. The model may use a table to store $I_o(V_c,V_o)$, such as illustrated by FIG. 13, which is indexed by both $V_c$ and $V_o$. To compute output current at time tn given a particular $V_c$ and $V_o$ at time $t_{n-1}$, the model may first find the nearest voltages in the table and then perform a two-dimensional interpolation to approximate the actual output current at $V_c$ and $V_o$. The model may also look up $C_g$ given $V_o$ from another table, such as illustrated in FIG. 14. With the values of $I_o$ and $C_g$ computed at time $t_n$, we can compute the value of $V_o$ and move on to the next time point $t_{n+1}$, at which we look up $I_o$ and $C_g$ again using $V_c$ and $V_o$ at time $t_n$. This process repeats until the whole output waveform is computed.

ViVo II Model Characterization

The ViVo II multi-CCC model for gates is characterized from a blackbox view of a standard circuit cell. To characterize a ViVo II multi-CCC model, the voltage and current waveforms at inputs and outputs of the standard cell are observed. Characterization starts at block 1600 and jumps to block 1602.

At block 1602, the output current $I_0$ is characterized for the driving stage of the multi-CCC current source model. The flow chart of FIG. 17 illustrates the characterization of the output current of the multi-CCC standard cell in greater detail.

Figure 17:
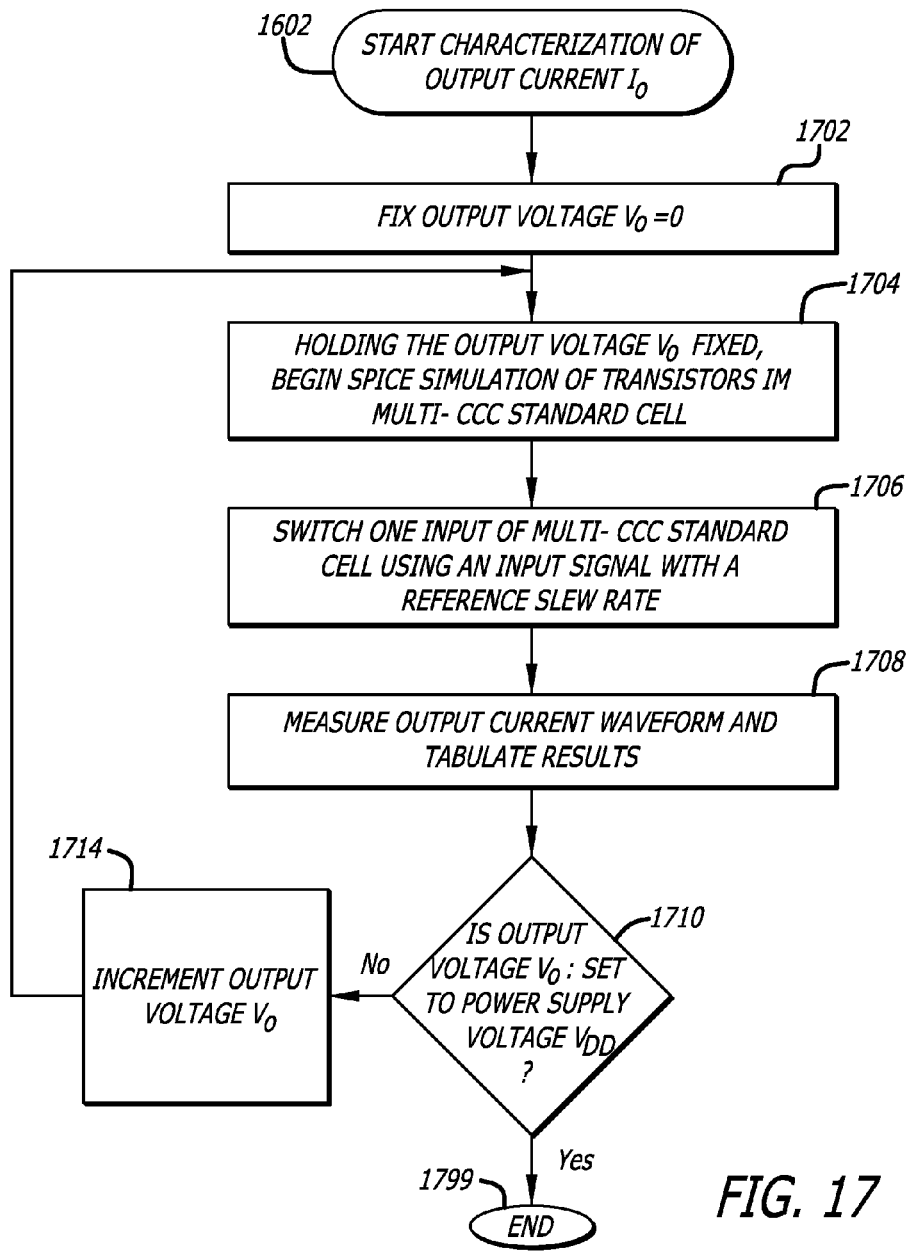
FIG. 17 is a flow chart to illustrate the characterization of the output current of the multi-CCC standard cell.

Referring now to FIG. 17, at block 1702, the output voltage $V_o$ is fixed to a known voltage, such as zero volts.

To characterize the driving stage $I_o(V_c, V_o)$, transient simulations with a SPICE transistor circuit simulator, such as Spectre software by Cadence Design Systems, Inc. are used to switch the input to the standard cell with its output voltage $V_o$ being fixed.

At block 1704, while holding the output voltage $V_o$ fixed, a spice transistor simulation is run on the multi-CCC standard cell.

At block 1706, one input of the multi-CCC standard cell is switched using an input signal with an initial reference slew rate.

At block 1708, the output current waveform is measured and the results are tabulated such as in FIG. 13.

At block 1710, a determination is made as to whether or not the output voltage was set to the power supply voltage Vdd. If so, the process ends at block 1799. If not, the process goes to block 1714.

At block 1714, the output voltage is incremented to a new value and the process returns to block 1704, to determine the output current for the new fixed value of output voltage Vo.

In the case of standard cells with only one CCC, performing a DC-analysis by sweeping $V_i$ and $V_o$ is sufficient to find $I_o(V_c, V_o)$. However for a multi-CCC standard cell, $I_o(V_c, V_o)$ a DC-analysis may not be used since the input voltage $V_i$ does not equal the intermediate voltage Vc.

Figure 6B:
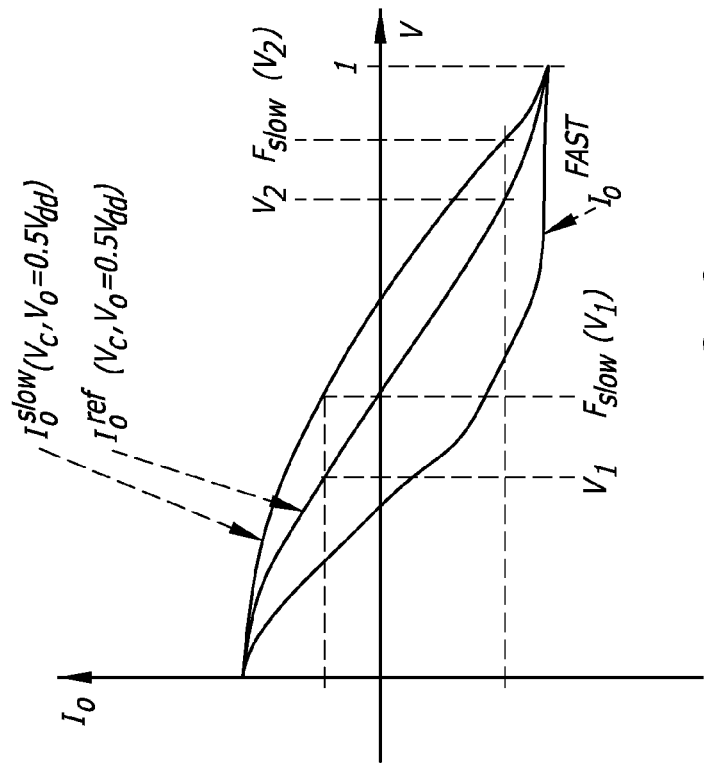
FIG. 6B illustrates normalized current curves from which parameters to characterize the voltage transform may be extracted.
Figure 6A:
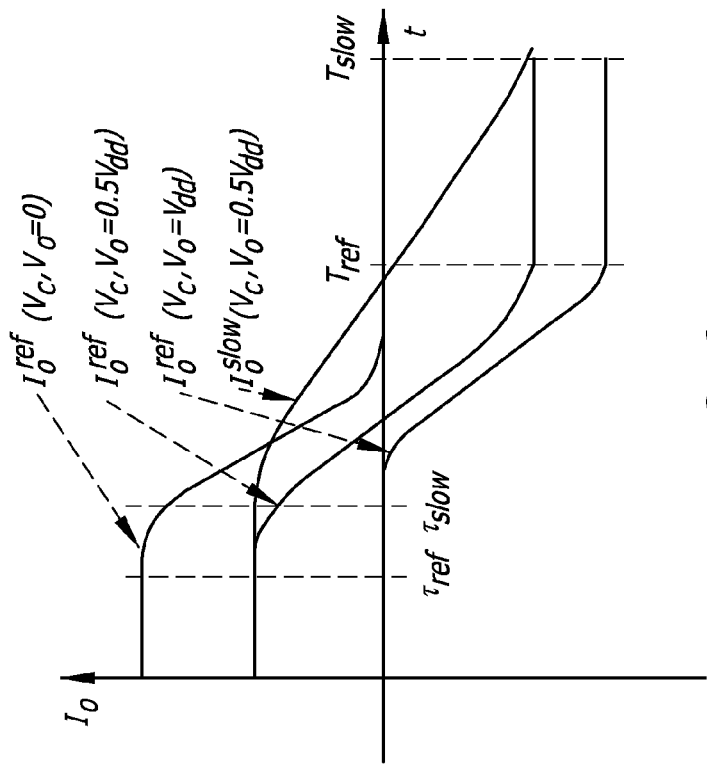
FIG. 6A illustrate output reference current waveforms generated by applying an input ramp voltage with a reference slew rate with different settings of fixed output voltage.

FIG. 6A shows three output current waveforms $I_o^{ref}$ which are obtained by applying an input ramp voltage $V_i(t)$ with a reference slew rate $\sigma_{ref}$ with different settings of fixed output voltage $V_o$. These curves are stored in the current table $I_o(V_c, V_o)$ of FIG. 13 for current look-up. FIG. 6A further shows an output current waveform $I_o^{slow}$ which is obtained by applying the input ramp voltage $V_i(t)$ with a slow slew rate $\sigma_{slow}$.

Figure 18:
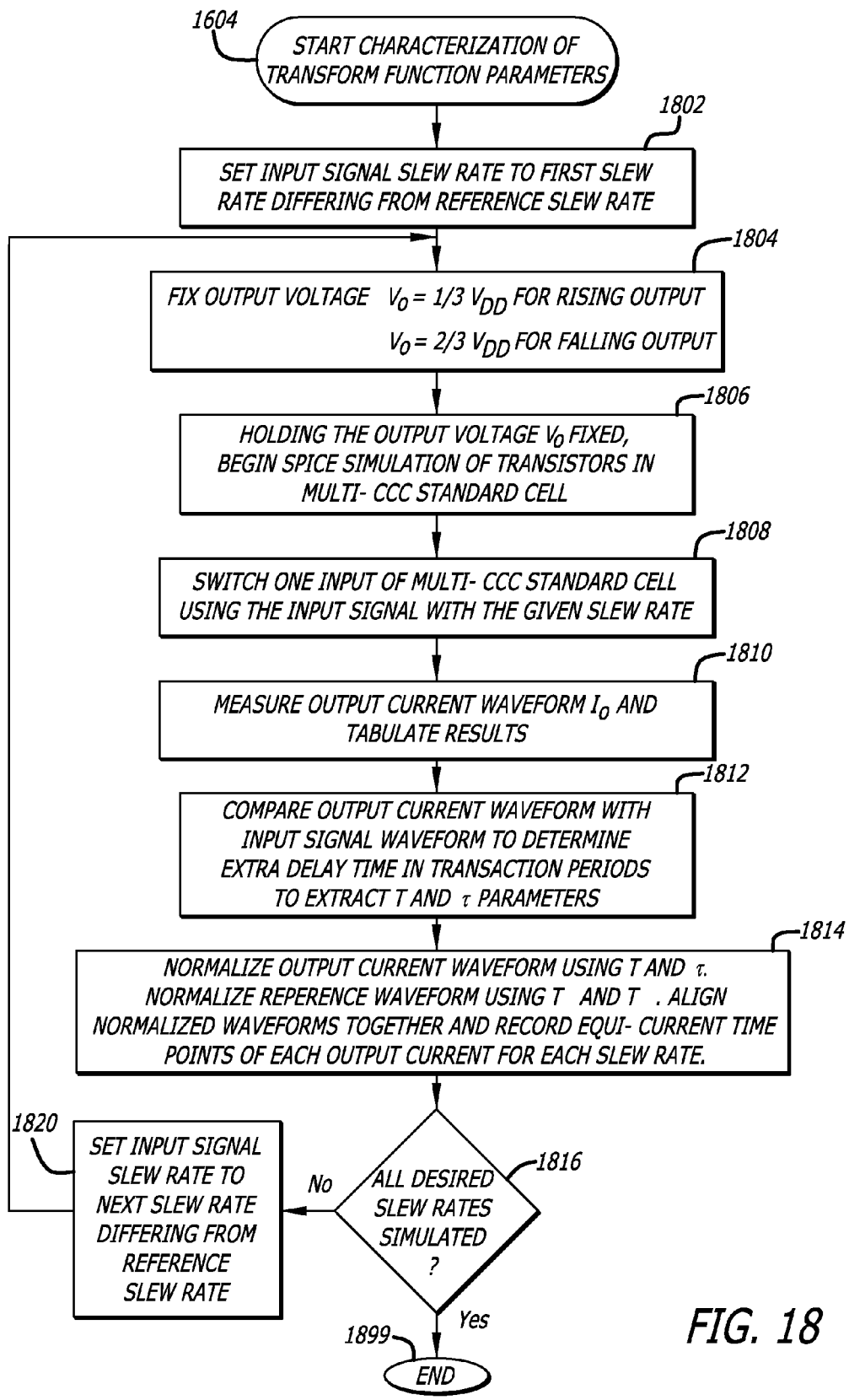
FIG. 18 is a flow chart to illustrate characterization of the voltage transform function of the multi-CCC standard cell.

At block 1604, the voltage transform function $\Gamma(V(t))$ of the multi-CCC standard cell is characterized. The flow chart of FIG. 18 illustrates the characterization of the voltage transform function $\Gamma(V(t))$ of the multi-CCC standard cell in greater detail. Characterizing the functional $\Gamma$ in Equation 1 requires extra simulations using different input slews than a reference slew rate $\sigma_{ref}$.

At block 1802 of FIG. 18, the input signal slew rate is set to a first slew rate that is different form the reference slew rate. For example, the input slew rate may be changed to a slow slew rate $\sigma_{slow}$.

At block 1804, the output voltage $V_o$ of the multi-CCC current source model is fixed to ⅓ of Vdd for a rising output and ⅔ of Vdd for a falling output.

At block 1806, with the output voltage fixed, SPICE transistor circuit simulations are run with the multi-CCC current source model.

At block 1808, one input of the multi-CCC standard cell is switched using the input signal with the differing slew rate than the reference slew rate.

At block 1810, the output current $I_o^{slow}$ is measured and results may be tabulated. FIG. 6A illustrates an $I_o^{slow}(V_c, V_o=x \cdot V_{dd})$ waveform which is obtained by changing input slew rate to $\sigma_{slow}$, where x is a fraction of ⅓ for rising output and ⅔ for falling output.

At block 1812, the output current waveform is compared with the input signal waveform to determine the extra delay time in the transition periods to extract $\tau_{slow}$ and $T_{slow}$ parameters, for example.

From $I_o^{slow}(V_c, V_o=x \cdot V_{dd})$ waveform curve we observe that the output current waveform incurs an extra delay of $\tau_{slow} - \tau_{ref}$ and its transition period stretches from $T_{ref}$ to $T_{slow}$ compared to the original reference current waveform $I_o^{ref}(V_c, V_o=x \cdot V_{dd})$. $T_{slow}$ and $\tau_{slow}$ are stored, in the table of FIG. 11 for example, for the input slew $\sigma_{slow}$ as part of the parameter for characterizing the functional $\Gamma$. Moreover, we can capture the non-linear shape difference between $I_o^{ref}(V_c, V_o=x \cdot V_{dd})$ and $I_o^{slow}(V_c, V_o=x \cdot V_{dd})$ by normalizing the time-axis $$v = \frac{t - \tau_\sigma}{T_\sigma},$$

where $\sigma = \sigma_{ref}$ and $\sigma_{slow}$, respectively.

At block 1814, the output $I_o^{slow}(V_c, V_o=x \cdot V_{dd})$ waveform curve is normalized using $\tau_{slow}$ and $T_{slow}$ parameters. The reference waveform curve $I_o^{ref}(V_c, V_o=x \cdot V_{dd})$ is normalized using its $\tau_{REF}$ and $T_{REF}$ parameters. The normalized output waveform curve and the normalized reference curve are aligned together and equal-current time points are recorded for each output current for their respective slew rates, such as illustrated by FIG. 15. The equi-current normalized time information further simplifies the computations and reduces the amount of information that need be stored to model a multi-CCC standard cell. The equi-current normalized time information is used to further transform the output waveform, be it an output current waveform $I_o$ or an output voltage waveform $V_o$.

Referring now back to FIG. 18 at block 1816, a determination is made if all desired slew rates differing from the reference slew rated have been simulated. If so, the process goes to block 99 and ends. If not, the process goes to block 1820.

At block 1820, the input signal slew rate is set to the next slew rate differing from the reference slew rate. The process then returns to block 1804 where the characterization process is repeated.

FIG. 6B illustrates normalized current curves from which parameters to characterize $F_o(v)$ may be extracted. This process may be repeated for a fast input slew $\sigma_{fast}$ to more accurately characterize $\Gamma$.

The current table of FIG. 13 is characterized for at least one input voltage slew rate, a reference slew rate $\sigma_0$ or $\sigma_{ref}$. In another embodiment of the invention, it is characterized for two slew rates, a fast slew rate $\sigma_1$ or $\sigma$fast, and a slow slew rate $\sigma_2$ or $\sigma_{slow}$. In another embodiment of the invention, it is characterized for at least three slew rates, the reference slew rate $\sigma_0$ or $\sigma_{ref}$, the fast slew rate $\sigma_1$ or $\sigma_{fast}$, and the slow slew rate $\sigma_2$ or $\sigma_{slow}$. The more characterization data, the better the interpolation accuracy with respect to input slew.

To adapt the characterized output currents to input voltage signals with different slew rates, the values in the current table are adjusted. With a multi-CCC standard cell, there are first and second order adjustments to be made. With a single-CCC standard cell, a first order adjustment for a different slew rate may only be made.

Figure 5A:
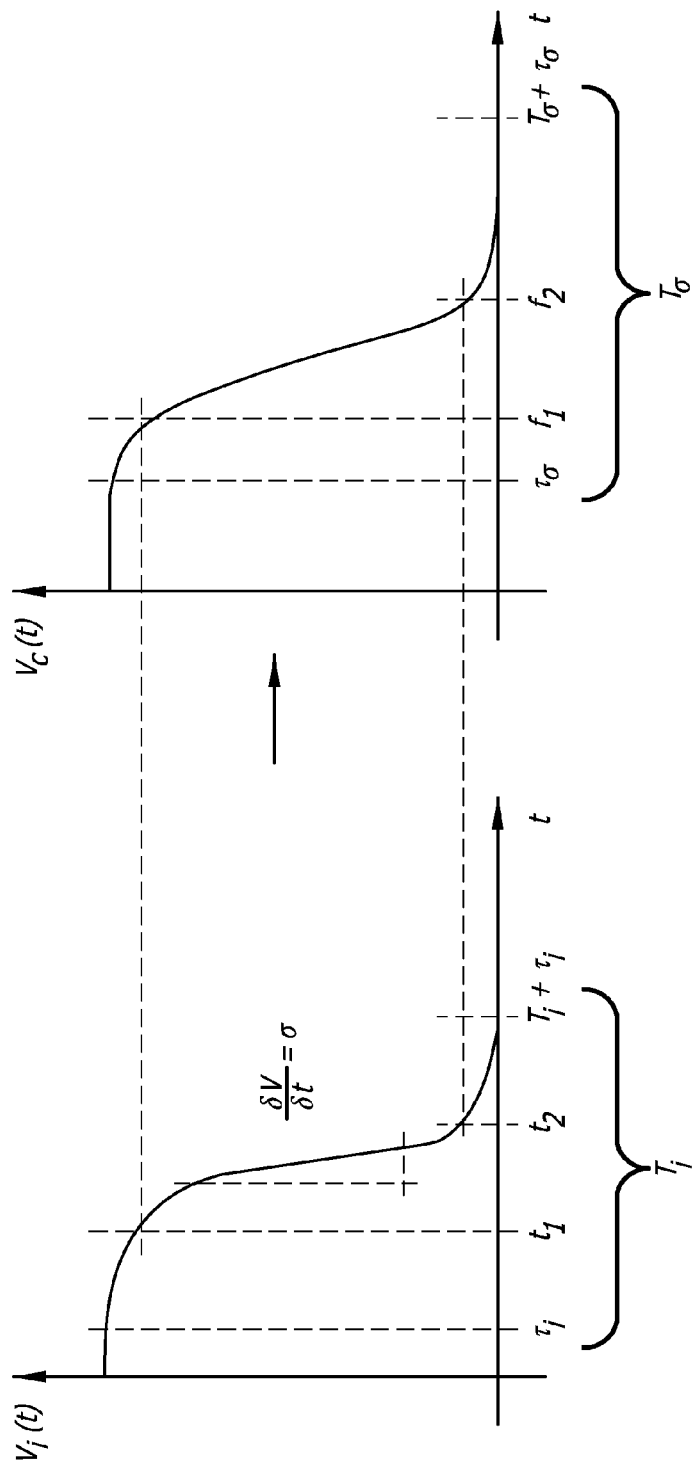
FIG. 5A illustrates an input voltage waveform and an intermediate voltage waveform generated by the application of voltage transform function in accordance with one embodiment of the invention.
Figure 5B:
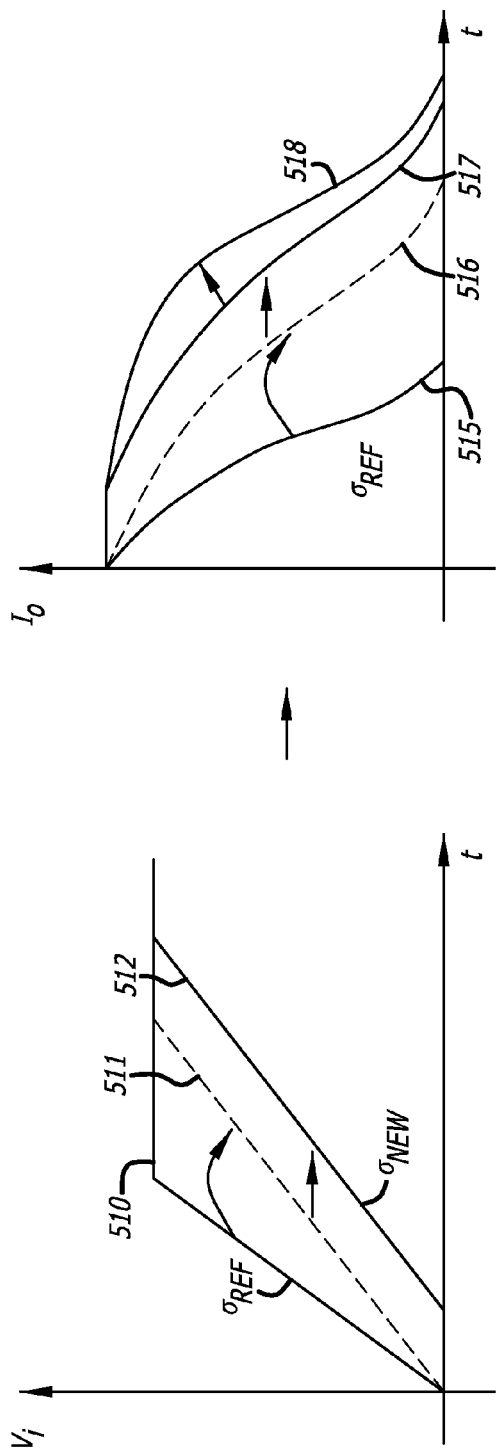
FIG. 5B illustrates an input voltage waveform and an output current waveform generated by the application of a second transform function in accordance with another embodiment of the invention.

Referring now to FIG. 5B, a first-order-only-transformation (applying Γ to the first order) of the voltage input waveform Vi into an output current waveform Io is illustrated. A reference voltage input waveform 510 was previously used to generate the tabulated output current waveform 515. A voltage input waveform 512 with a new slew rate (indicated by the slope) and a delayed start (indicated by the offset from time zero) is coupled into the single-CCC standard cell. The new voltage input waveform 512 results in a new output current waveform 517. The output current waveform 518 is the result of a SPICE transistor circuit simulation for comparison with the output current waveform 517 of the multi-CCC model.

A first order output adjustment to the output current waveform is due to the change input slew rate illustrated by the slope of waveform 511 and the delayed start of the input illustrated by the time offset between waveforms 511 and 512. The change in slope of the input waveform (illustrated by the difference between waveforms 511 and 510) results in a change in slope in the output waveform as illustrated by the difference between output waveforms 515 and 516. The delayed start in the input waveform (illustrated by the difference between waveforms 512 and 511) results in a delayed start in the output waveform as illustrated by the difference between output waveforms 517 and 516. The change in slope is established by a stretch parameter T. The change in start time is established by a shift parameter τ.

A second order output adjustment to the output current waveform is the result of the extra gate stages in a multi-CCC standard cell. The new voltage input waveform is coupled into a different gate than that of the last driving stage of a multi-CCC standard cell. The second order adjustment to the output current waveform is illustrated by the difference between output waveforms 518 and 517. The second order output adjustment is modeled by a time transformation function Γ that is responsive to the new input slew rate. If the standard cell is a simple single-CCC standard cell, the time transformation function is u=v, where v is the normalized time with respect to the current table and u is the normalized simulation time. That is, there is no second order output adjustment to be made to a simple standard cell with a single-CCC. The first order output adjustment may be made to a simple standard cell with a single CCC.

Figure 5C:
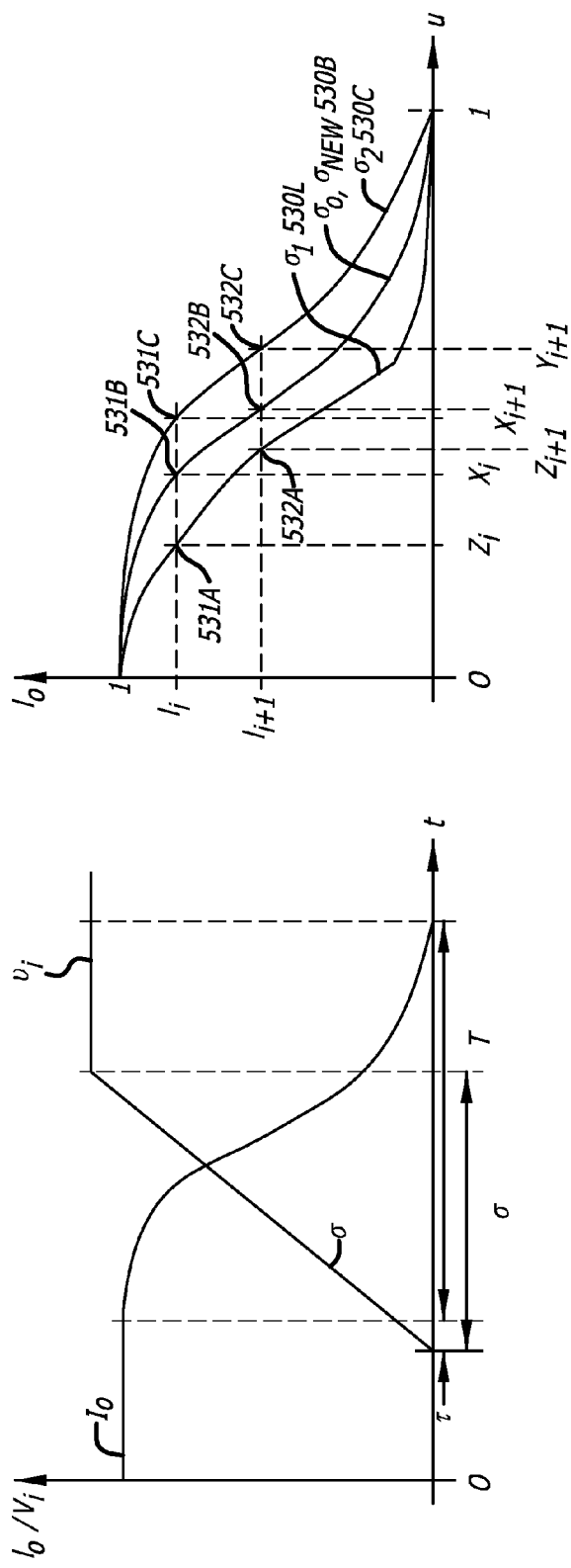
FIG. 5C illustrates an input voltage waveform with a new slew rate and characterization of the second transform function in accordance with another embodiment of the invention.

Referring now to FIG. 5C, the characterization of a time transformation function Γ is now described. A voltage input waveforms $V_i$ and its respective output current $I_o$ over time are plotted in the left chart. Output current waveforms Io normalized for time are plotted in the right chart.

From the plots of voltage input waveforms Vi with different slew rates and their respective output current Io, the shift parameters τ and the stretch parameters T are first measured. The shift parameters τ and the stretch parameters T for each voltage input waveform and its respective slew rate may be tabulated, such as illustrated in FIG. 11.

The output current waveforms Io are aligned and normalized for time over U from zero to one, such as illustrated in the right chart of FIG. 5C. Three output current waveforms Io 530A-530C are illustrated in the right chart of FIG. 5C with slew rates $\sigma_1$, $\sigma_0$, and $\sigma_2$, respectively. A plurality of equi-current points $I_i$ are selected and their normalized times U for all of the output current waveforms Io 530A-530C with their respective slew rates are recorded into a table, such as the table illustrated in FIG. 15.

For example, consider the equi-current point $I_i$ illustrated in the right chart of FIG. 5C that intersects the waveforms 530A-530C at points 531A-531C, respectively. At point 531A on waveform 530A, the normalized time is $Z_i$. At point 531C on waveform 530C, the normalized time is $Y_i$. At point 531B on waveform 530B, the normalized time is $X_i$. These normalized time points are tabulated in FIG. 15.

As another example, consider the equi-current point $I_{i+1}$ illustrated in the right chart of FIG. 5C that intersects the waveforms 530A-530C at points 532A-532C, respectively. At point 532A on waveform 530A, the normalized time is $Z_{i+1}$. At point 532C on waveform 530C, the normalized time is $Y_{i+1}$. At point 532B on waveform 530B, the normalized time is $X_{i+1}$. These normalized time points are also tabulated in FIG. 15. Additional equi-current points are selected and their respective normalized times for each waveform and slew rate are tabulated. The greater the number of equi-current points selected the better the accuracy of the model. Additionally the greater the number of output currents characterized for different input slew rates, the better the accuracy of the model.

Figure 5D:
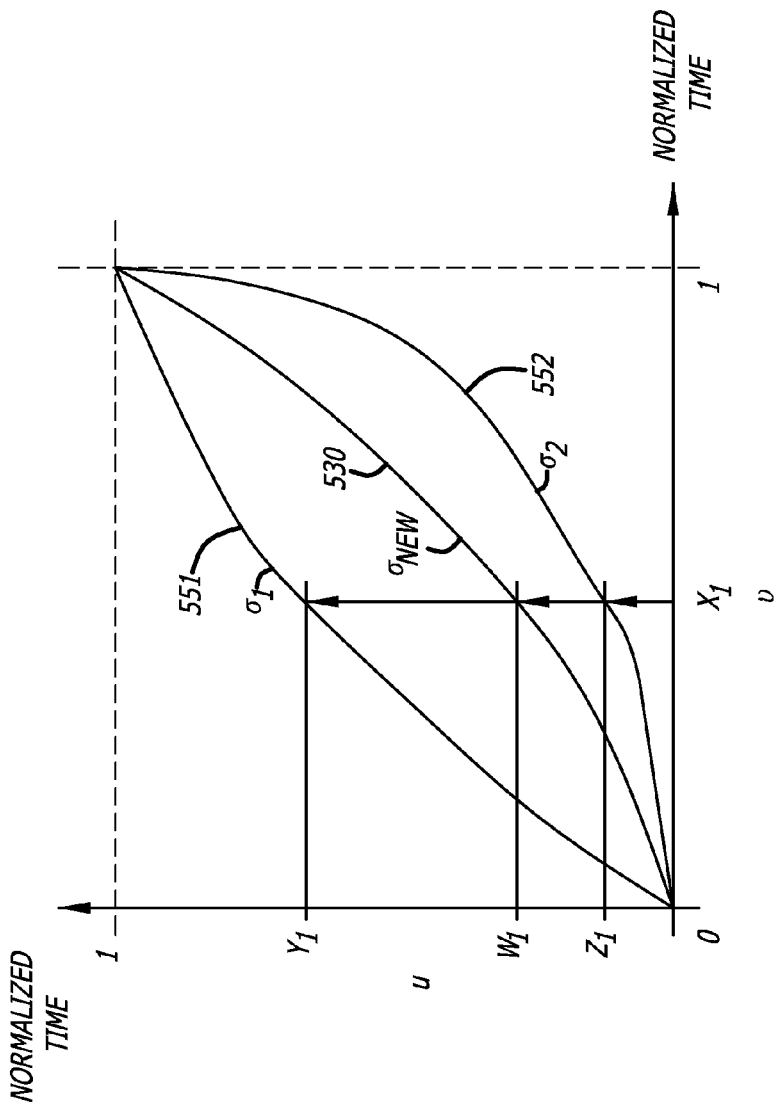
FIG. 5D illustrates equi-current normalized time curves to perform time transformation and generate an output current in response to an input voltage waveform with a new slew rate in accordance with another embodiment of the invention.

Referring now to FIG. 5D, the equi-current values of the output current waveform with their respective slew rates can be inverted and normalized with respect to time in order to form time transformation curves 551, 552 illustrated in FIG. 5D. That is, FIG. 5D illustrates time versus time plots plotted from FIG. 5C. Time transformation waveforms 551, 552 with respective slew rates of $\sigma_1$ and $\sigma_2$ are illustrated in FIG. 5D.

With curves 551 and 552, a new intermediate voltage waveform 530 with respect to a new slew rate $\sigma_{new}$ may be readily interpolated by applying the second order adjustment. The interpolation is to construct an intermediate waveform for a multi-CCC standard cell to assist in output current look-up during simulation. The curves 551 and 552 of FIG. 5D may be stored in a table, such as illustrated in FIG. 15, as piece-wise linear time versus time curves.

The characterized time transformation curves of FIG. 5D for the slew rates $\sigma_1$ and $\sigma_2$ may be saved and used as part of the multi-CCC current source model. After determining a new slew rate of an input voltage waveform to a multi-CCC standard cell, the characterized time transformation curves 551-552 of FIG. 5D for the slew rates $\sigma_1$ and $\sigma_2$, respectively, may be utilized to interpolate a new time transformation curve 550 associated with the new slew rate $\sigma_{new}$ of the input voltage waveform.

At a normalized time of $u_1$ in FIG. 5D, curves 551 and 552 have normalized equi-current values of $Y_1$ and $Z_1$, respectively. The new transformation curve 550 has an interpolated value of $W_1$ at a normalized time of $X_1$. Equivalent ratios may be set up to interpolate all values of W along the curve 530 as follows:

$$\frac{y-x}{\sigma_1 - \sigma_{new}} = \frac{y-z}{\sigma_2 - \sigma_1} \quad (4)$$

for all values of normalized time u and each respective value of y and z. The equation may be solved for the value w along the curve 530 as follows:

$$w = y\left[1 - \frac{\sigma_1 - \sigma_{new}}{\sigma_2 - \sigma_1} + z\frac{\sigma_1 - \sigma_{new}}{\sigma_2 - \sigma_1}\right] \quad (5)$$

Figure 9:
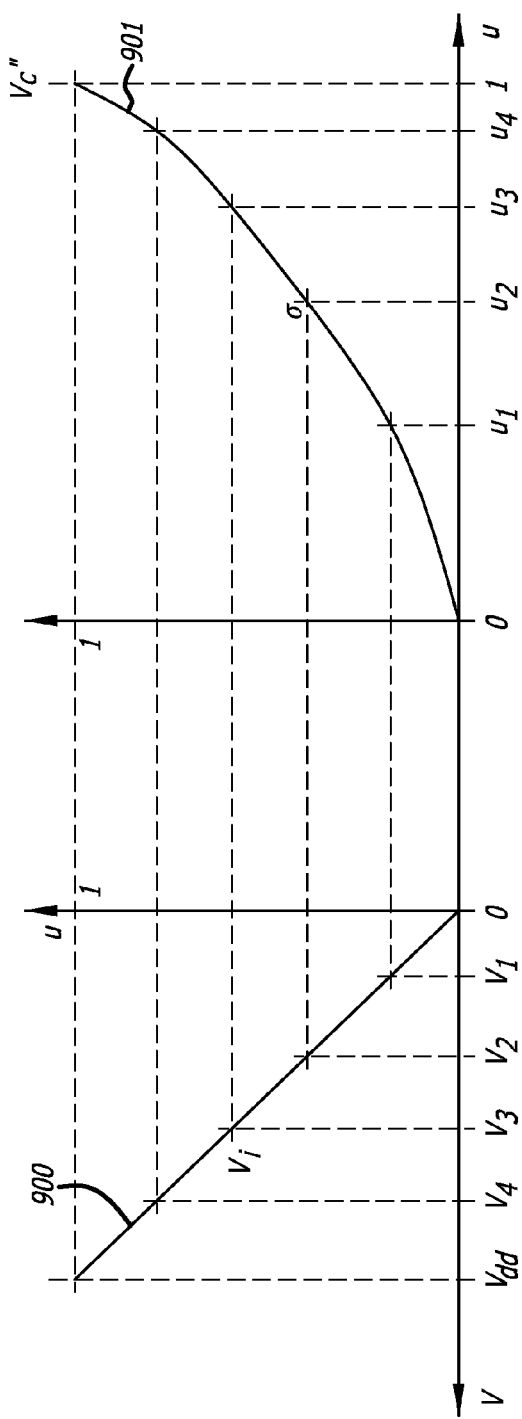
FIG. 9 illustrates a normalized input voltage waveform and a partially transformed voltage waveform.

Referring now to the left graph illustrated in FIG. 9, the input voltage waveform is then normalized by shifting the starting time point to zero at the origin and scaling the time axis so that the normalized input waveform $V_i$ 900 goes from the normalized time of zero to one.

Using the new time transformation curve 550, new time points are generated from the new input voltage waveform 900 to begin its transformation into the intermediate voltage waveform $V_c''$ 901 as illustrated by the right graph in FIG. 9.

Using the new slew rate $\sigma_{new}$, values for a new shift parameter and a new stretch parameter may be interpolated from a parameter look up table, such as the table illustrated in FIG. 11. A pair of parameter values $\tau_1$ and $\tau_2$ with respective slew rates $\sigma_1$ and $\sigma_2$ around the new slew rate $\sigma_{new}$ are chosen. A new shift parameter $\tau_{new}$ may be interpolated from the equivalent ratios in the following equation:

$$\frac{\tau_1 - \tau_{new}}{\sigma_1 - \sigma_{new}} = \frac{\tau_1 - \tau_2}{\sigma_1 - \sigma_2} \quad (6)$$

The equation may be solved for the new shift parameter value $\tau_{new}$ as follows:

$$\tau_{new} = \tau_1\left[1 - \frac{\sigma_1 - \sigma_{new}}{\sigma_1 - \sigma_2} + \tau_2\frac{\sigma_1 - \sigma_{new}}{\sigma_1 - \sigma_2}\right] \quad (7)$$

A pair of parameter values $T_1$ and $T_2$ with respective slew rates $\sigma_1$ and $\sigma_2$ around the new slew rate $\sigma_{new}$ are chosen. A new stretch parameter $T_{new}$ may be interpolated from the equivalent ratios in the following equation:

$$\frac{T_1 - T_{new}}{\sigma_1 - \sigma_{new}} = \frac{T_1 - T_2}{\sigma_1 - \sigma_2} \quad (8)$$

The equation may be solved for the new stretch parameter value $T_{new}$ as follows:

$$T_{new} = T_1\left[1 - \frac{\sigma_1 - \sigma_{new}}{\sigma_1 - \sigma_2} + T_2\frac{\sigma_1 - \sigma_{new}}{\sigma_1 - \sigma_2}\right] \quad (9)$$

Figure 10:
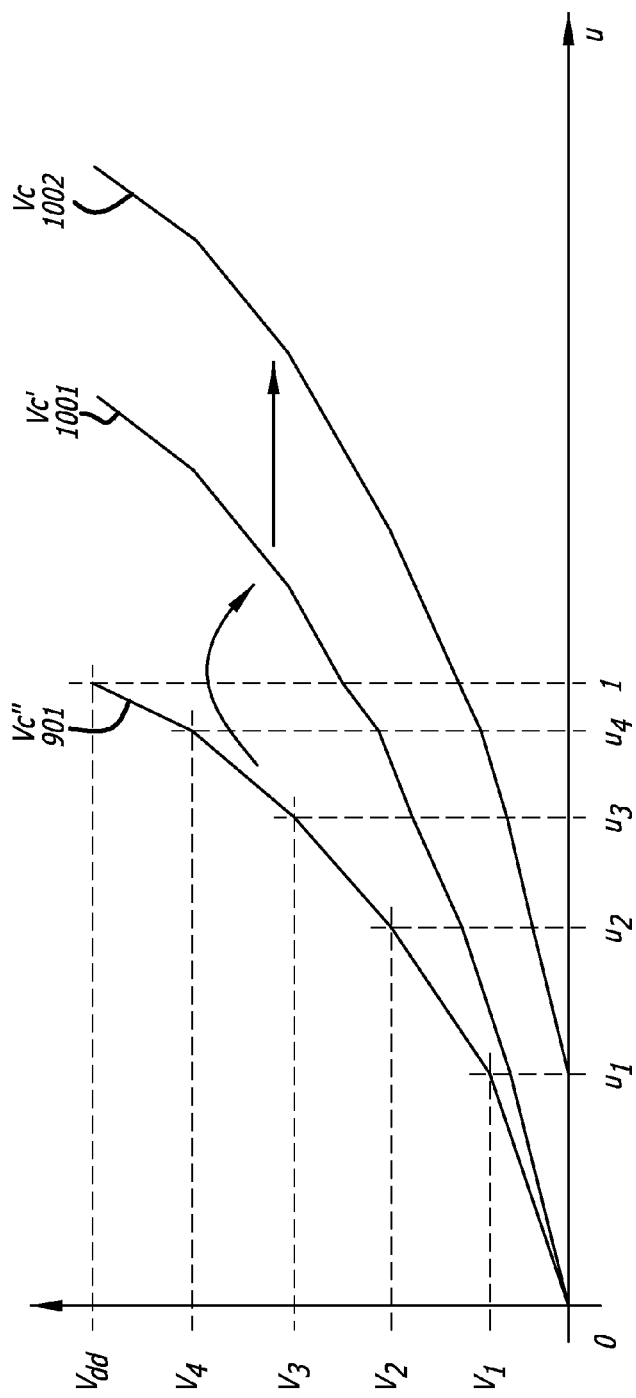
FIG. 10 illustrates the final transformations of the partially transformed voltage waveform into the intermediate voltage waveform.

Referring now to FIG. 10, the intermediate voltage waveform $V_c''$ 901 is further transformed by the stretch parameter value $T_{new}$ by stretching it into the intermediate voltage waveform $V_c'$ 1001. The intermediate voltage waveform $V_c'$ 1001 is finally transformed by the shift parameter value $\tau_{new}$ by shifting it into the final intermediate voltage waveform $V_c$ 1002.

Figure 19:
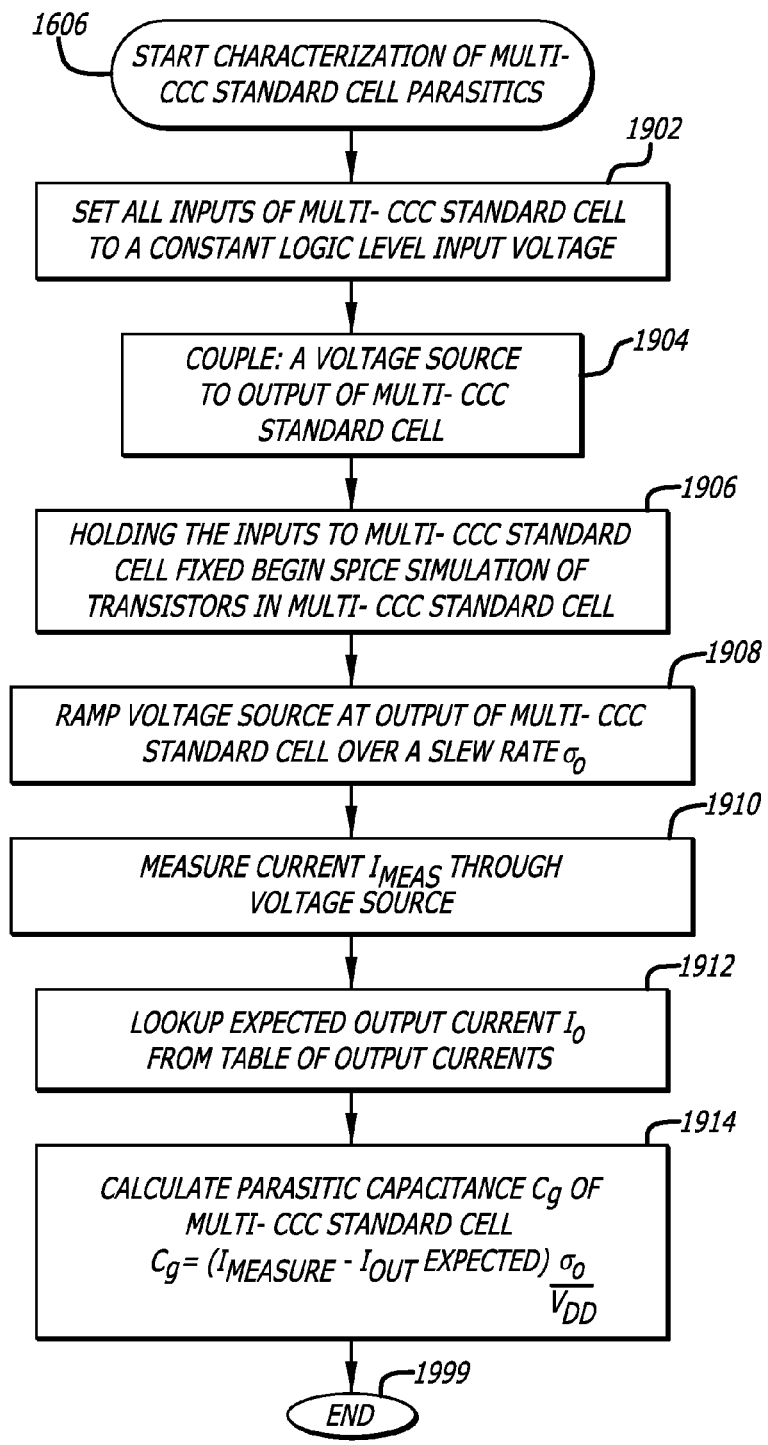
FIG. 19 illustrates a flow chart of the characterization of the standard cell parasitics.

At block 1606, the parasitic capacitance of the standard cell for the multi-CCC current source model is characterized. The flow chart of FIG. 19 illustrates the characterization of the parasitics of the standard cell in greater detail.

At block 1902, all the inputs of the multi-CCC standard cell are set to a constant logic level input voltage. At block 1904, a voltage source is coupled to the output of the multi-CCC standard cell. With the input voltage Vi being held constant, the intermediate voltage level Vc is also held constant.

At block 1906, while holding the inputs to the multi-CCC standard cell fixed, a SPICE transistor circuit simulation is run of the transistors in the given multi-CCC standard cell.

At block 1908, to characterize $C_g(V_o)$, the voltage source at output applies a voltage ramp with a slew rate $\sigma_o$ at the output of the multi-CCC standard cell.

At block 1910, the current ($I_{meas}$) going through the voltage source at the output of the multi-CCC standard cell which asserts the voltage ramp is measured.

At block 1912, the expected initial output current $I_o(V_c(t=0), V_o)$ may be looked up from a current table, such as the table illustrated in FIG. 13, given that we set the output voltage $V_o$ and we estimated the intermediate voltage $V_c(t=0)$ at time zero.

At block 1914, given the foregoing information, $C_g(V_o)$ can be computed by using Eq. 10 as follows:

$$Cg = \frac{(I_{meas} - I_o(V_c(t=0), V_o)) \cdot \sigma_o}{V_{dd}} \quad (10)$$

where $I_{meas}$ is the measured current and $I_o(V_c(t=0), V_o)$ is the initial output current that may be looked up from a current table.

Figure 16:
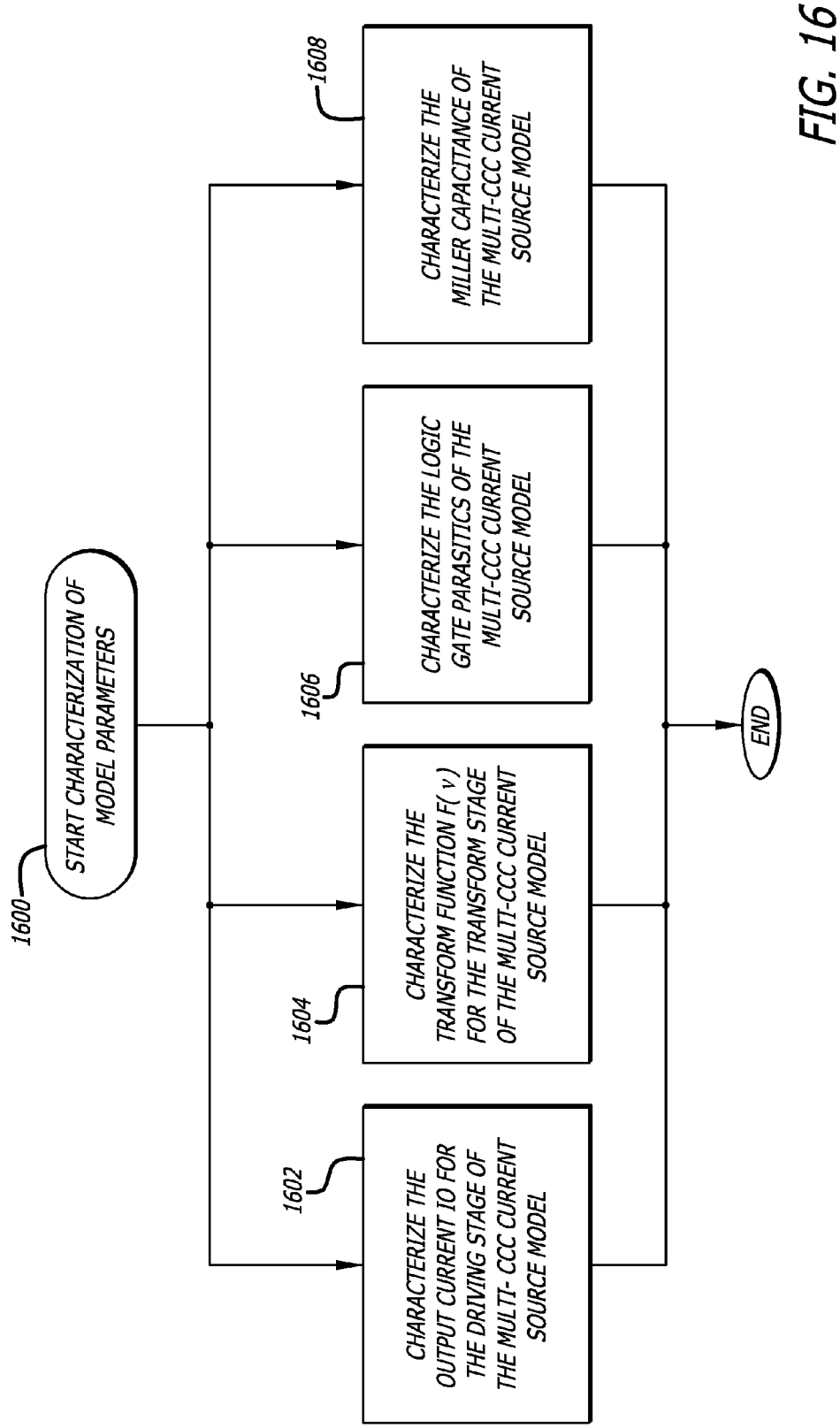
FIG. 16 is a flowchart illustrating the characterization of model parameters for the multi-CCC current source model.

At block 1608 in FIG. 16, the miller capacitance of the multi-CCC current source model may also be characterized.

Figure 4C:
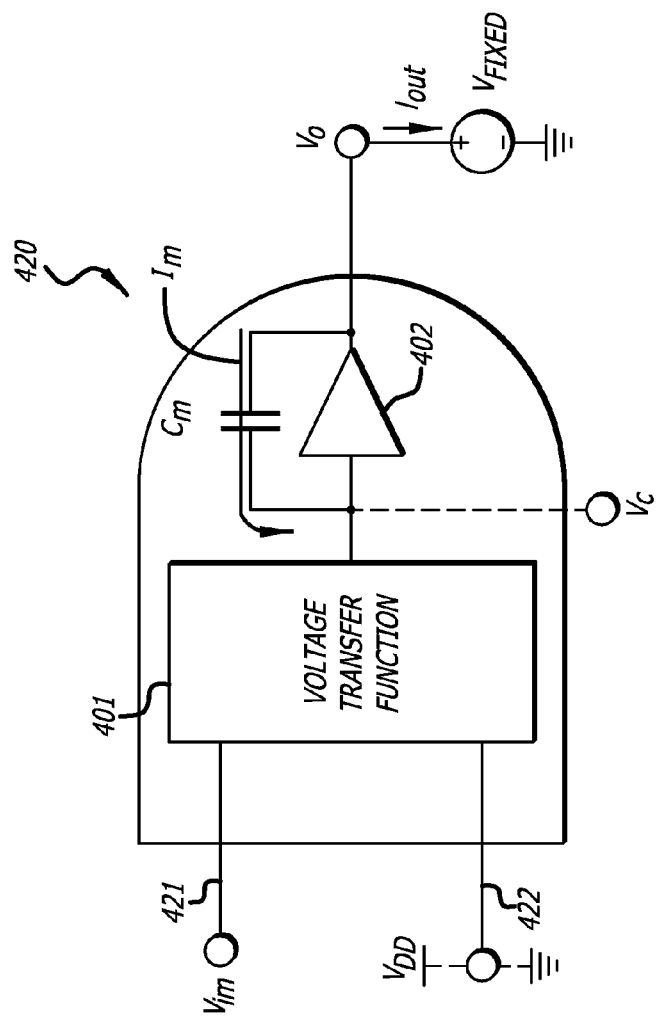
FIG. 4C illustrates an abstracted view of another multi-stage standard cell, such as an AND gate, configured for characterizing the miller capacitance ($C_{miller}$ or $C_m$) of the multi-CCC current source model."
Figure 20:
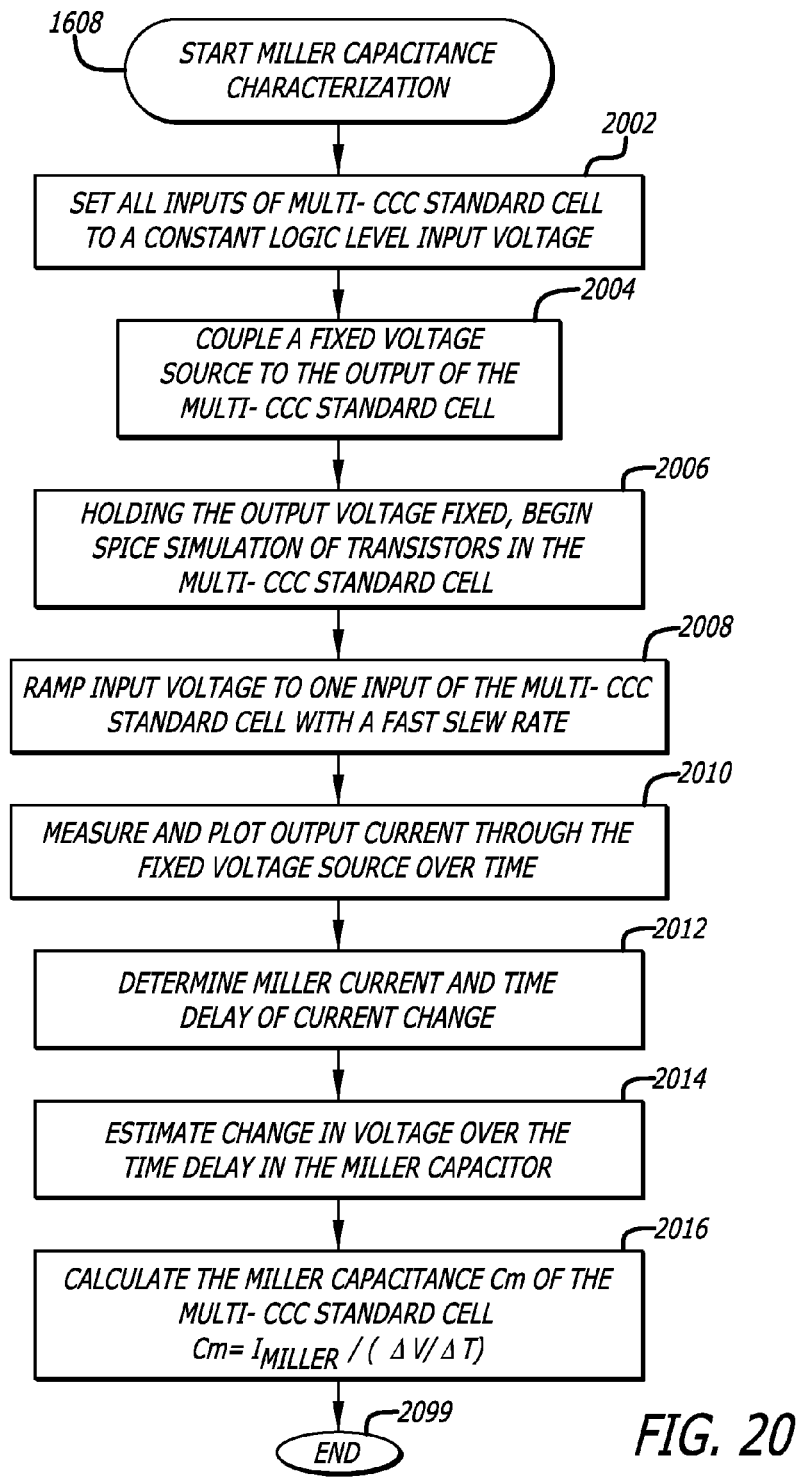
FIG. 20 illustrates a flow chart of the characterization of the miller capacitance.

Referring now to FIG. 20 and FIG. 4C, a method of characterizing the miller capacitance ($C_{miller}$ or $C_m$) of the multi-CCC current source model is now described.

At block 2002, all the inputs 422 but one input 421 of the multi-CCC standard cell 420 are set to a constant logic level input voltage. They may be set to a constant high logic level by coupling to the positive power supply voltage VDD or a constant low logic level by being coupled to ground VSS.

At block 2004, a fixed voltage source $V_{fixed}$ is coupled to the output of the multi-CCC standard cell 420. The fixed voltage source $V_{fixed}$ may be fixed to a constant positive power supply voltage level (VDD) in one embodiment of the invention or a constant zero volts in another embodiment of the invention.

At block 2006, while holding the output voltage of the multi-CCC standard cell fixed to the fixed voltage source $V_{fixed}$, a SPICE transistor circuit simulation is run of the transistors in the given multi-CCC standard cell.

At block 2008, to characterize the miller capacitance $C_m$, a voltage source applies a voltage ramp with a fast slew rate $\sigma_{fast}$ at the input 421 to the multi-CCC standard cell 420. The slew rate of the voltage ramp should be as fast as possible for best results.

At block 2010, the output current ($I_{out}$) going through the fixed voltage source is measured and plotted over time in response to the voltage ramp at the input 421 of the multi-CCC standard cell.

At block 2012, the miller current $I_{miller}$ or $I_m$ is determined and a time delay S in the change of the output current is also determined from the plotted output current. The time delay S is used as the change in the time period for the voltage decay over the miller capacitor.

Figure 22A:
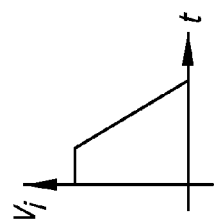
FIGS. 22A-22C illustrate plots of exemplary waveforms for the input voltage ramp Vi, intermediate voltage Vc, and the output current $I_{out}$ for characterization of the miller capacitance in one embodiment of the invention.
Figure 22B:
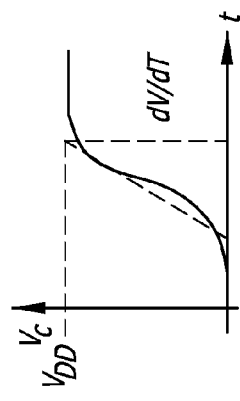
Figure 22C:
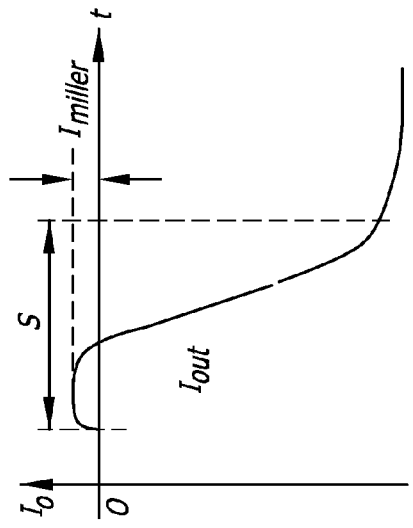
Figure 23A:
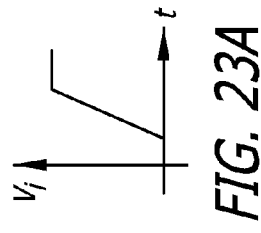
FIGS. 23A-23C illustrate plots of exemplary waveforms for the input voltage ramp Vi, intermediate voltage Vc, and the output current $I_{out}$ for characterization of the miller capacitance in another embodiment of the invention.
Figure 23B:
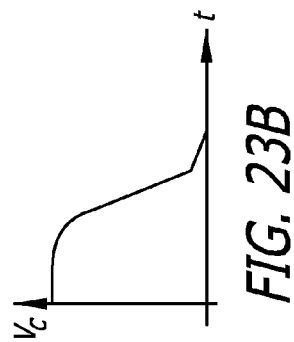
Figure 23C:
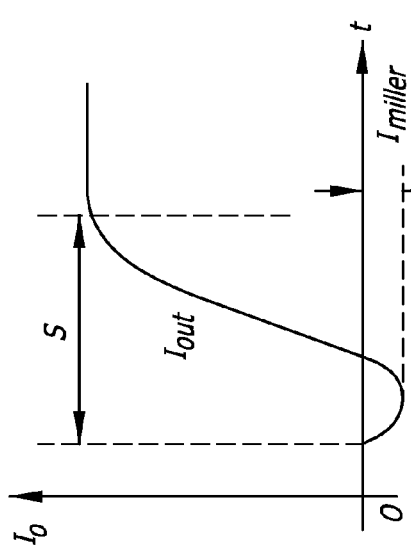

Referring now to FIGS. 22A-22C, plots of exemplary waveforms for the input voltage ramp Vi, intermediate voltage Vc, and the output current $I_{out}$ are illustrated in the case that the fixed voltage source is set to the positive power supply voltage VDD. FIGS. 23A-23C illustrate plots of exemplary waveforms for the input voltage ramp Vi, intermediate voltage Vc, and the output current $I_{out}$ in the case that the fixed voltage source is set to the zero volts.

In either case, the miller current is a current that results because the miller capacitor resists an instantaneous change in voltage. The miller current flows from the input to the driver stage of the multi-CCC current source model through the miller capacitor to the output node Vo. The miller current is the instantaneous change in current illustrated in FIGS. 22C and 23C as a result in the initial change in the intermediate voltage Vc in FIGS. 22B and 23B. The driver stage of multi-CCC current source model has yet to turn on and provide a current. Thus, the measured output current is the miller current prior to the driver stage turning on and driving a current into the output node.

The current through a capacitor is known to be proportional to the product of the capacitance and a time derivative of the voltage. The latter can be approximated by a change in voltage divided by a change in time:

$$I_m = C_m \frac{\delta v}{\delta t} \quad (11)$$

Rearranging Eq. 11 to solve for the miller capacitance we get:

$$C_m = \frac{I_m}{\left(\frac{\delta v}{\delta t}\right)} \quad (12)$$

At block 2014, the change in voltage over time in the miller capacitor is estimated using the time delay S. That is, dV/dt is congruent to the positive power supply voltage VDD divided by the time delay S or VDD/S.

At block 2016, the miller capacitance is calculated using Eq. 12 and the measured miller current Im through the miller capacitor Cm and the change in voltage over time VDD/S across the miller capacitance. After the miller capacitance is determined for the given multi-CCC standard cell, it is stored with the other parameters of the multi-CCC current source model.

After the miller capacitance is determined, the characterization of the miller capacitance ends at block 2099.

Generally, the multi-CCC current source model is efficient in the runtime that is required to characterize the model, as well as the amount of data storage need to preserve its parameters. The multi-CCC current source model can achieve sufficient accuracy by keeping seven $V_o$ values and twenty time samples of $I_o^{ref}(V_c(t), V_o)$ for each $V_o$ in the $I_o(V_c, V_o)$ table of FIG. 13. $C_g(V_o)$ may require only seven $V_o$ values in its table of FIG. 14. It is also sufficient to store values of $T_o, \sigma_o$ and $F_o(v)$ for three different input slew rates, a reference input slew $\sigma_{ref}$, a slow input slew $\sigma_{slow}$, and a fast input slew $\sigma_{fast}$ that may be stored in tables, such as tables illustrated in FIGS. 11 and 12. Characterizing these parameters may take about ten transistor circuit simulations using a transistor circuit simulator, such as Cadence Design Systems, Inc.'s Spectre transistor circuit simulator, compared to about eighty transistor circuit simulations that may be required for other gate models.

Delay Calculation for Application Specific IC Design

The embodiments of the invention may be used with or in a static timing analyzer for analyzing the timing of an integrated circuit.

Figure 21:
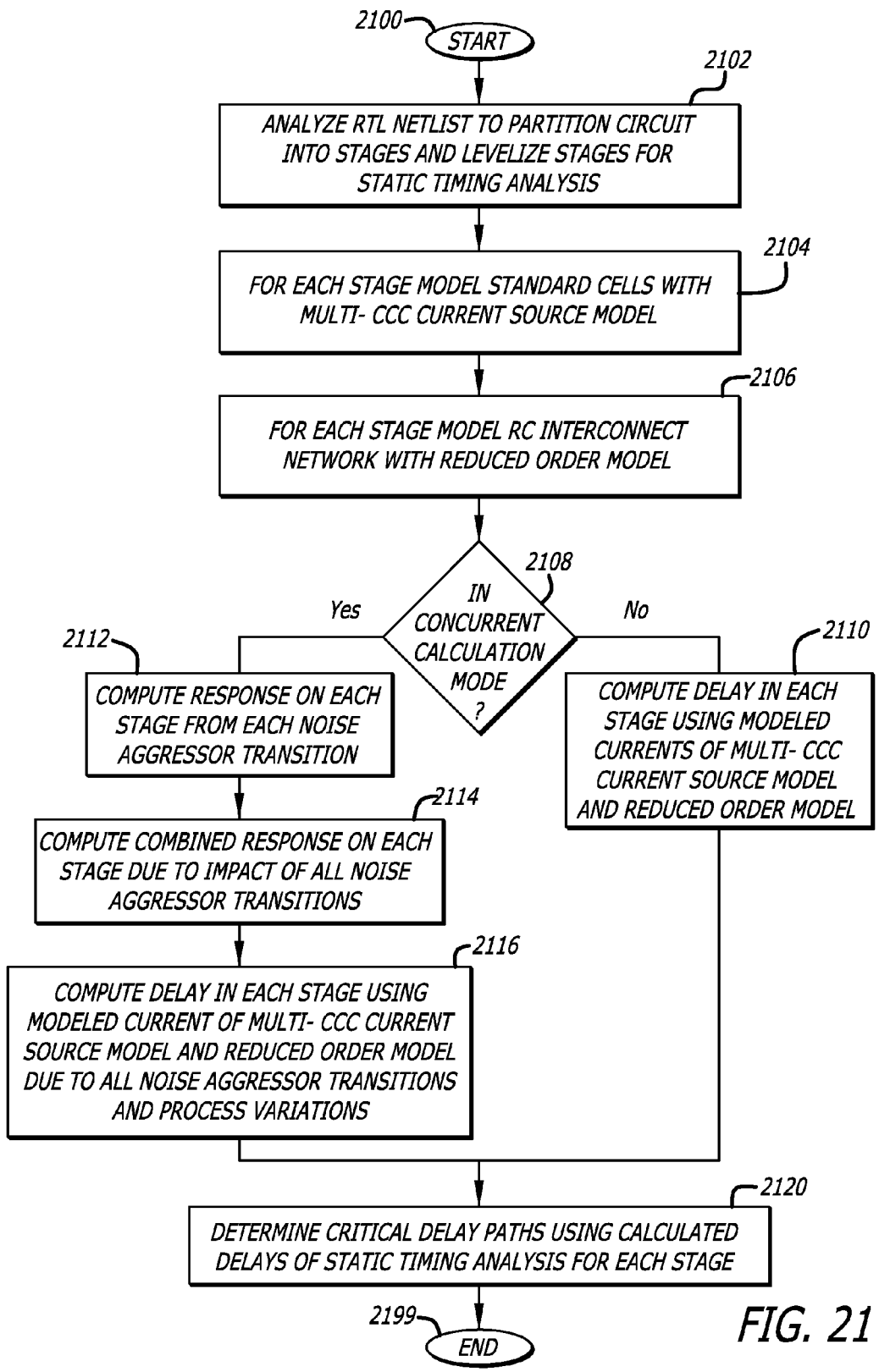
FIG. 21 is a flow chart for performing a timing analysis of the circuit netlist of FIG. 1D.

Referring now to FIG. 21 and FIGS. 1C-1D, a timing analysis of the circuit netlist of FIG. 1D may be made starting at block 2100 in FIG. 21 which jumps to block 2102.

At block 2102, a netlist is analyzed to partition a circuit into stages. The stages are further levelized to perform static timing analysis. Each stage may include one or more standard cells and associated interconnect.

At block 2104 in each stage, one or more standard cells are modeled using a multi-CCC current source model. If a standard cell is a single-CCC standard cell, the multi-CCC current source model may still be used with the voltage transform function having a unity value of one such that the intermediate voltage is the input voltage.

At block 2106 in each stage, the coupled RC interconnect network may be generated from a parasitic extraction after a circuit is laid out or the parasitics may be generated in response to the netlist after logic synthesis and possibly a floor plan of the functional blocks of the circuit, if available. The parasitics of the coupled RC interconnect network in each stage are modeled using a reduced order model (ROM).

At block 2108, a determination is made as to whether or not the system is in a concurrent calculation mode. A concurrent calculation mode includes a noise or signal integrity analysis as part of the multi-CCC current source model. If not, the process goes to block 2110. If so, the process goes to block 2112.

At block 2110, the delay in each stage is computed using the modeled current of the multi-CCC current source model and the modeled parasitics of the reduced order model (ROM). The process then goes to block 2120.

At block 2112 for each stage, assuming concurrent calculation mode, the response on the output of each stage due to each noise aggressor transition is computed and tabulated. The process may then go to block 2114.

At block 2114 for each stage, the combined response on the output of each stage in response to all noise aggressor transitions may be computed and tabulated.

Next at block 2116, for each stage, the delays and the sensitivities to all noise aggressors and process variations are computed via simulation using the multi-CCC current source model and the reduced-order model (ROM) for the associated RC interconnect. The receiving gates in each stage are modeled using constant capacitors. The process then goes to block 2120.

At block 2120, the calculated delays of each stage are used by a static timing analysis tool to determine the critical delay paths. The process goes to block 2199 and ends.

Stage Delay Calculation Under Process Variations

The multi-CCC current source model may be used to perform timing delay calculations on a stage of a circuit in the presence of process variations. Process variations can effect the interconnect as well as the transistors used in the logic cells of a standard cell library. For example, a metallization process is used to manufacture the interconnect within an integrated circuit. During the metallization process, the sheet resistance may vary in the metal as well as the width and thickness of metal lines due to process variations and change the impedance.

Figure 24:
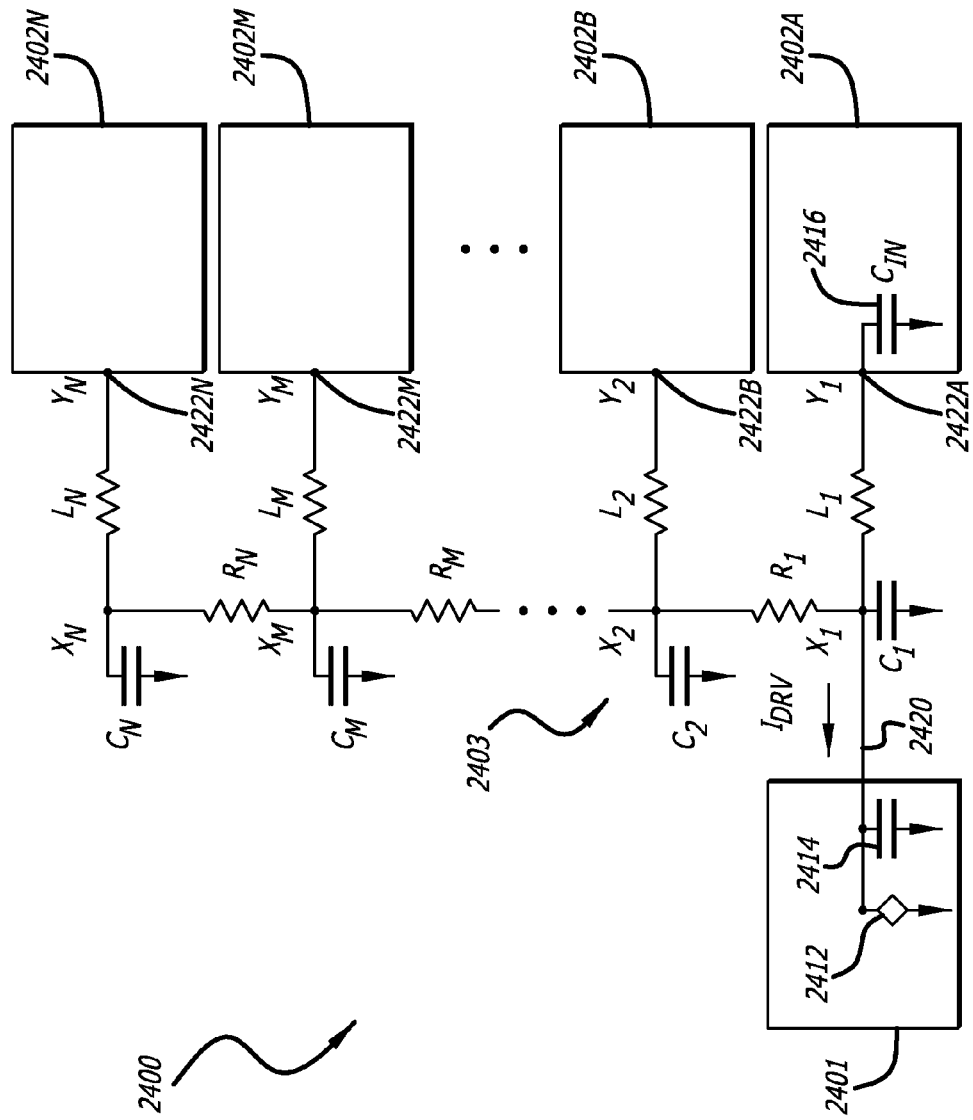
FIG. 24 illustrates a block diagram of a circuit stage for a vector analysis of the timing delay and the sensitivity of the timing delay to process variations.

Referring now to FIG. 24, a circuit stage 2400 is illustrated including a driver 2401 connected to a plurality of receivers 2402A-2402N through an interconnecting net 2403. The stage 2400 is modeled by a circuit consisting of the net's parasitics and its driver 2401 and receivers 2402A-2402N. For the sake of simplicity, a net is assumed to have a single victim driver as shown. However, the methods may be adopted with modification for the general case of multiple driving stages.

For calculation of STA delays at the driver output (port) X1 2420 and receiver inputs (taps) Y1-YN 2422A-2422N, the transition at the driver input is required. Correspondently, the delay calculator computes voltage responses at the so-called probing points Yd, Y1-YN (2420, 2422A-2422N in FIG. 24)—nodes which are connected to output of the driving gate and inputs of receiving gates, respectively.

For calculation of the responses at the probing points Yd,Y1-YN 2400,2422A-2422N, a state-space formulation is used. A vector of voltages V $(v_1, \ldots, v_{N+1})$ is formed at nodes of the RC network in the stage 2400. The vector V of voltages may be formed so that $v_1$ denotes $v_d$–a voltage on the output node (port) from the driver 2401 as shown in FIG. 24, and $v_2, \ldots, v_{N+1}$ denote respectively voltages at input nodes (taps) of the receiving gates—$\sigma_{r1}, \ldots, v_{rN}$.

To enable an efficient and accurate delay calculation the nonlinear parts of the stage are approximated using appropriate models. The driver 2401 is modeled with the multi-CCC current source model described previously. The driver 2401 includes a voltage controlled current source 2412 and a capacitance $C_g$ 2414. Calculation of responses at the stage's probing points is performed after responses are computed at the previous stages and parameters of input transitions, such as slews and delays, are determined at the inputs of the stage being analyzed.

During calculation of responses, it is assumed that voltage at one of the inputs of the driving gate is transitioning (either rising or falling) and this causes some transition at the nodes of the driven interconnect. We can assume that for each input pin of the driving gate, direction of transition at the input and output pins and logical values at other input pin, there exists a unique current source model describing current at the output pin as a function of voltage transitions at the switching input and output pins: $I=I_{drv}(v_{in}(t),v_{out}(t))$. However, since transition at the inputs of the driving gate are known at the time of delay calculation at the stage, the driver current source can be represented as a function of time and voltage at the output node of the driving gate: $I=I_{drv}(t,v_{out}(t))$.

For a given switching input pin, directions of transitions at the input and the output of the driving gate and logical values at the other inputs, the current drawn by the driver is thus a known function of time t and voltage $v_1$ and may be designated as $I_{drv}(t,v_1)$.

Each of the receivers or receiving gates 2402A-2402N may be modeled using a constant input capacitor $C_{in}$ 2416 extracted from a standard cell library for the respective type of cell or gate.

Kirchhoffs current law (KCL) equations regarding the principle of conservation of electric charge, may be applied to describe the stage 2400 as follows:

$$C\frac{dv}{dt} + Gv = BI_{drv}, \qquad (13)$$

$$y=Lv \qquad (14)$$

In the left-hand side of Eq. 13, C is a capacitance matrix, G is a conductance matrix, and v is the voltage vector. The vector $y=\{v_1,v_2, \ldots, v_{M+1}\}$ denotes voltages at the probing points which include output of the driver and inputs to the receiving gates of the M receivers 2402A-2402N as shown in FIG. 24.

In the right-hand side of Eq.13,14, the matrices B and L are respectively input and output position matrices, and $I_{drv}$ is the current drawn by the driver current source.

The input capacitors modeling the receiver gates 2402A-240@N may be added into the capacitance matrix C.

The set of equations (13,14) is sufficient to calculate responses at the probing points, which may be achieved via simulation of the circuit using numerical integration of the governing equations (13,14). Note that the current source model for the driver is different for different input switching pins, input and output direction transition and values at side (other) inputs. That is, for each such configuration of the driver, a separate simulation is required.

Since RC interconnect may include hundreds or even thousands of resistors and capacitors, it is usually expensive to integrate Eqs.(13,14) with highly sparse matrices G,C. In order to make simulation more efficient a model-order reduction (MOR) may be performed to generate a load model (a reduced order model ROM) of the RC interconnect. Model-order reduction is generally described in U.S. Patent Application Publication No. 2006/0095236A for U.S. patent application Ser. No. 10/932,406 filed on Sep. 2, 2004 by Joel R. Phillips and incorporated herein by reference. The model-order reduction results in much more compact state-space equations with very little loss of accuracy. The reduction produces a reduced-order model (ROM) for the interconnect parasitics, which also includes receiver pin capacitors. After the reduced-order model (ROM) for the interconnect parasitics is generated, the state-space equations can be formulated in this conventional form:

$$E\frac{dx}{dt} = Ax + Bu \qquad (15)$$

$$y=Cx \qquad (16)$$

Note that matrix C in Eq.(16) is unrelated to the capacitance matrix used in Eq.(13). The vector x is the state vector, which usually has much smaller dimension that original vector of node voltages. Vector y is the vector of probing points as before, and u in the right-hand side of Eq. (15) is the driver current $I_{drv}$. The input to the ROM, which is the node where a driver is connected to, and the outputs, which are nodes where receiving gates are connected to, are often referred to as port and taps, respectively. Matrices E,A are of much smaller size than before reduction.

Generally, both linear and nonlinear elements of a circuit are functions of process parameters. Let a vector $\lambda=\{\lambda_n\}$ with $n=1, \ldots, P$ denote a vector of interconnect and cell process parameters. It is assumed that the capacitance and the conductance matrices of the original state-space system $C(\lambda)$, $G(\lambda)$ and driver current source $I_{drv}(t, v, \lambda)$ are known functions of process parameters. Likewise, the state-space matrices of the reduced system A,E are also functions of process parameters. Moreover, the capacitance matrix $C(\lambda)$, the conductance matrix $G(\lambda)$, the driver current source $I_{drv}(t, v, \lambda)$, of the original stage-space system and the state-space matrices A,E of the reduced state-space system can also be modeled so that the effects of variation of temperature and variation in power supply voltage Vdd can be accounted for.

For a fixed vector of process parameters $\lambda$ the port and tap responses can be determined by solving both of the equations (5,6). This may be done for instance using trapezoidal integration method. Since excitation u is a nonlinear function of the port voltage, Newton-Raphson iterations are used at each time step. This means that the responses and correspondent delays are implicitly functions of process parameters.

The delay calculation problem of the stage 2400 may be formulated as a problem of finding the port and tap responses y and the correspondent delays and slews as functions of vector λ. Some delay characteristics are of particular interest in the presence of process variations. The timing delay of the stage (the "stage delay") is of interest at a particular point of the subspace of process parameters, referred to as a process parameter vector (PPV). The maximum (and minimum) values of the stage delay within a certain range (subspace) of process parameters may be of interest. Moreover, the sensitivity of the stage delay with respect to process parameters at a particular process parameter vector may be of interest.

In the presence of large variations in process parameters, one approach to model the stage delay is to choose a representative set of process parameter vectors, often referred to as set of process corners, and perform a delay calculation at each process corner. The selection of the corners is usually done in such a way as to cover the feasible space of process variations and ensure that the maximum and/or minimum timing delays are reached at least one of the chosen corners. However with a large number of process parameters, the number of corners to ensure a conservative analysis may be too high for the process corner approach of analyzing timing delays to be practical.

However, all or several of the process parameters may vary within a relatively small range. In this case, an efficient technique to model the timing delay with process variations is as a linear function of the process parameters. This approach is based on a sensitivity analysis. The sensitivity of delay is defined as a derivative of the timing delay with respect to a varying parameter. Since the behavior of timing delay in a sufficiently small vicinity of a chosen process parameter vector is linear with respect to the process parameters, knowing the delay and its sensitivities at a process parameter vector provides a good model for the delay in the vicinity of the process parameter vector.

Calculation of Delay, Slew and Their Sensitivities to Process Variations

An algorithm for the calculation of the stage delay and delay sensitivity at a given process parameter vector is now described with reference to FIG. 24.

A state-space system for the voltage responses at the output (port) X1 2420 of the driver 2401 and receiver inputs (taps) Y1-YN 2422A-2422N of the receivers 2402A-2402N in the presence of process variations may be written as $$E(\lambda)\frac{dx}{dt} = A(\lambda)x + Bu(\lambda) \tag{17}$$

$$y = Cx \tag{18}$$

Since both matrices and excitation vector depend on process parameter vector λ, the solution must depend on λ as well.

In order to find sensitivity of the stage delay with respect to process parameters at a given process parameter vector, the state-space system as well as responses are expanded in Taylor series around some nominal value of the process parameter vector $\lambda = \lambda_{nom}$.

Assuming that small variations of process parameters around their nominal values cause the variation of responses to be also small, the circuit responses in the vicinity of the nominal vector of process parameters can be sought in the form of a Taylor series with respect to the deviation of the process parameter vector from its nominal value: $\delta = \lambda - \lambda_{nom}$:

$$A = A^{(0)} + \Sigma \delta_n A_n^{(1)} + \ldots \tag{19}$$

$$E = E^{(0)} + \Sigma \delta_n E_n^{(1)} + \ldots \tag{20}$$

$$u = u^{(0)} + \Sigma \delta_n u_n^{(1)} + \ldots \tag{21}$$

$$x = x^{(0)} + \Sigma \delta_n x_n^{(1)} + \ldots \tag{22}$$

In equations 19-22, the zero-order terms $A^{(0)}$, $E^{(0)}$, $u^{(0)}$, $x^{(0)}$, correspond to nominal matrices excitation and states which are taken at $\lambda = \lambda_{nom}$. In this approach which uses Z-formulation, the matrices B and C do not depend on process parameters and therefore do not need to be expanded. The first-order terms are summations of a product of the deviation $\delta_n$ of process parameter $\lambda_n$ from its nominal value and the sensitivity (or partial derivative) of the correspondent function with respect to this process parameter, e.g.

$$A_n^{(1)} = \frac{\partial A}{\partial \lambda_n}\bigg|_{\lambda_n = \lambda_{n,nom}}$$

At zero order we have the following problem:

$$E^{(0)}\frac{dx^{(0)}}{dt} = A^{(0)}x^{(0)} + Bu^{(0)} \tag{23}$$

$$y^{(0)} = Cx^{(0)} \tag{24}$$

Before formulating the first-order problem allowing sensitivity calculations, notice that since $u = I_{drv}(t, v_1(\lambda), \lambda)$ depends on process parameters via two latter arguments, the sensitivity with respect to (w.r.t.) $\lambda_n$ is $$u_n^{(1)} = \frac{\partial I_{drv}}{\partial \lambda_n}\bigg|_{\lambda_n = \lambda_{n,nom}} + g(t) * v_{1,n}^{(1)} \tag{25}$$

In Equation 25, g(t) is the small-signal admittance of the current at the nominal voltage response:

$$g(t) = \frac{dI_{drv}(t, v_d)}{dv_d}\bigg|_{v_d = y_1^{(0)}} \tag{26}$$

The two components in the first-order correction of driver current are due, respectively, to variation of the gate driving strength itself, and due to change in driver output response.

At the first order we obtain a set of linear problems, one for each process parameter as follows:

$$E^{(0)}\frac{dx_n^{(1)}}{dt} - A^{(0)}x_n^{(1)} - Bg(t)y_{1,n}^{(1)} = A_n^{(1)}x^{(0)} - E_n^{(1)}\frac{dx^{(0)}}{dt} + Bu_n^{(1)} \tag{27}$$

$$y_n^{(1)} = Cx_n^{(1)} \tag{28}$$

In equation 27, $y_{1,n}^{(1)}$ is first element of vector $y_n^{(1)}$, which is the sensitivity of driver output response w.r.t. parameter $\lambda_n$ and it can be expressed via $x_n^{(1)}$ using Eq. (28).

Equations 27,28 are linear with respect to sensitivity values. All quantities in the right-hand side of equations 27,28 are known since they depend on the nominal response which is found from equations 23,24. The sensitivities can be calculated from equations 27,28 using different numerical methods for solving a set of linear ordinary differential equations. For instance, a trapezoidal numerical integration method can be used to calculate the sensitivities using equations 27,28.

In another embodiment of the invention, the total delay under nominal conditions may initially be computed. The non-linear circuit equations for the stage including current source model for the driver $I_{drv}$ and ROM for interconnect may be formulated in their parameterized form with respect to the process parameter vectors. The port and tap responses as well as the equations and the driver current equations may be expanded around the nominal values of process parameter. The sensitivities of the responses and hence delays to process variations may be determined from a set of linear equations (27,28) obtained by the application of a perturbation method to original equations (17,18).

Results

Digital electrical analysis engines are usually compared against a SPICE-like transistor level circuit simulator, such as Cadence Design Systems, Inc. Spectre transistor level circuit simulator product. A number of tests have been performed to validate the accuracy of the multi-CCC current source model. A comparison was made on a stage by stage basis. The basic structure of all netlists is a three-stage gate chain. The test-suite has thousands of combinations of input slews, drivers, interconnect topologies, lengths and sizes. To validate nominal delay, noise coupling capacitors of the interconnect, if any, are coupled to ground. Each of the cells in the standard cell library, such as a commercial 90 nm technology cell library, is completely characterized for the multi-CCC current source model beforehand. The library models for the electrical simulation engine may also be fine tuned to achieve greater accuracy.

Figure 7:
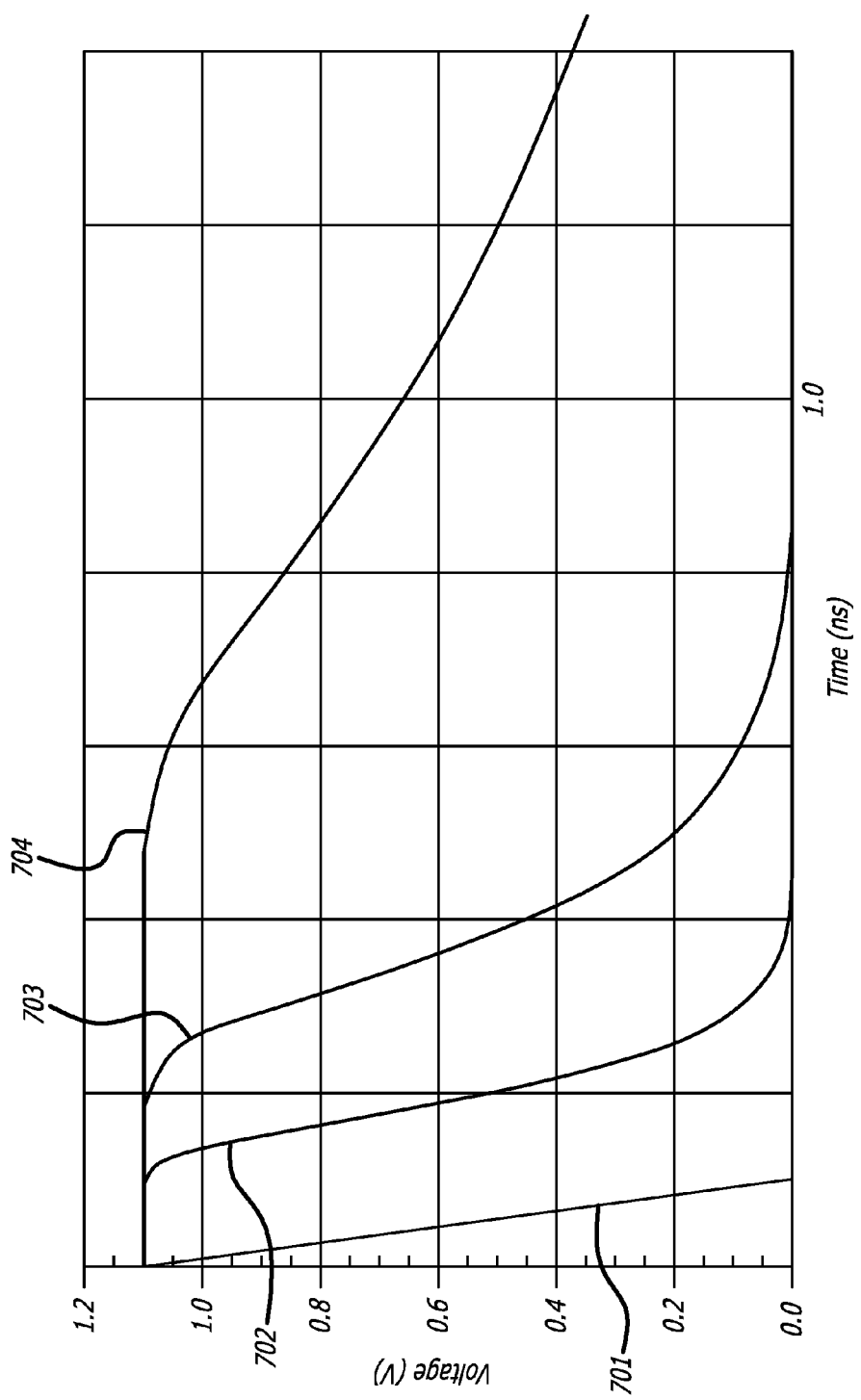
FIG. 7 shows voltage waveform results from a static timing analyzer using the multi-CCC current source model and a spice transistor level circuit simulator for comparison.

Referring now to FIG. 7, voltage waveform results of a static timing analysis using the digital delay calculator with a multi-CCC current source model and transistor level simulations generated by Cadence Design System, Inc.'s Spectre transistor level simulator are plotted for comparison.

The test case used to generate the plots of FIG. 7 was three stages of AND gates coupled in series together with an interconnect network with a maximum span of 200 microns (μm). An AND gate is a multi-CCC standard cell with its driver stage being an inverter. The ramp input voltage waveform $V_i(t)$ 701 coupled to the input of the multi-CCC standard cell in the first stage had a slew rate of 100 pico-seconds (ps). The other curves plotted in FIG. 7 are pairs of curves both generated at the following stages: input voltage $V_i(t)$ 702 at stage 2, input voltage $V_i(t)$ 703 at stage 3, and output voltage $V_{out}(t)$ 704 at the output port of stage 3. The calculated results from the static timing analysis using the digital delay calculator and the simulated results of the transistor level simulator are substantially similar such that the pairs of curves are indistinguishable from each other at each stage.

Figure 8:
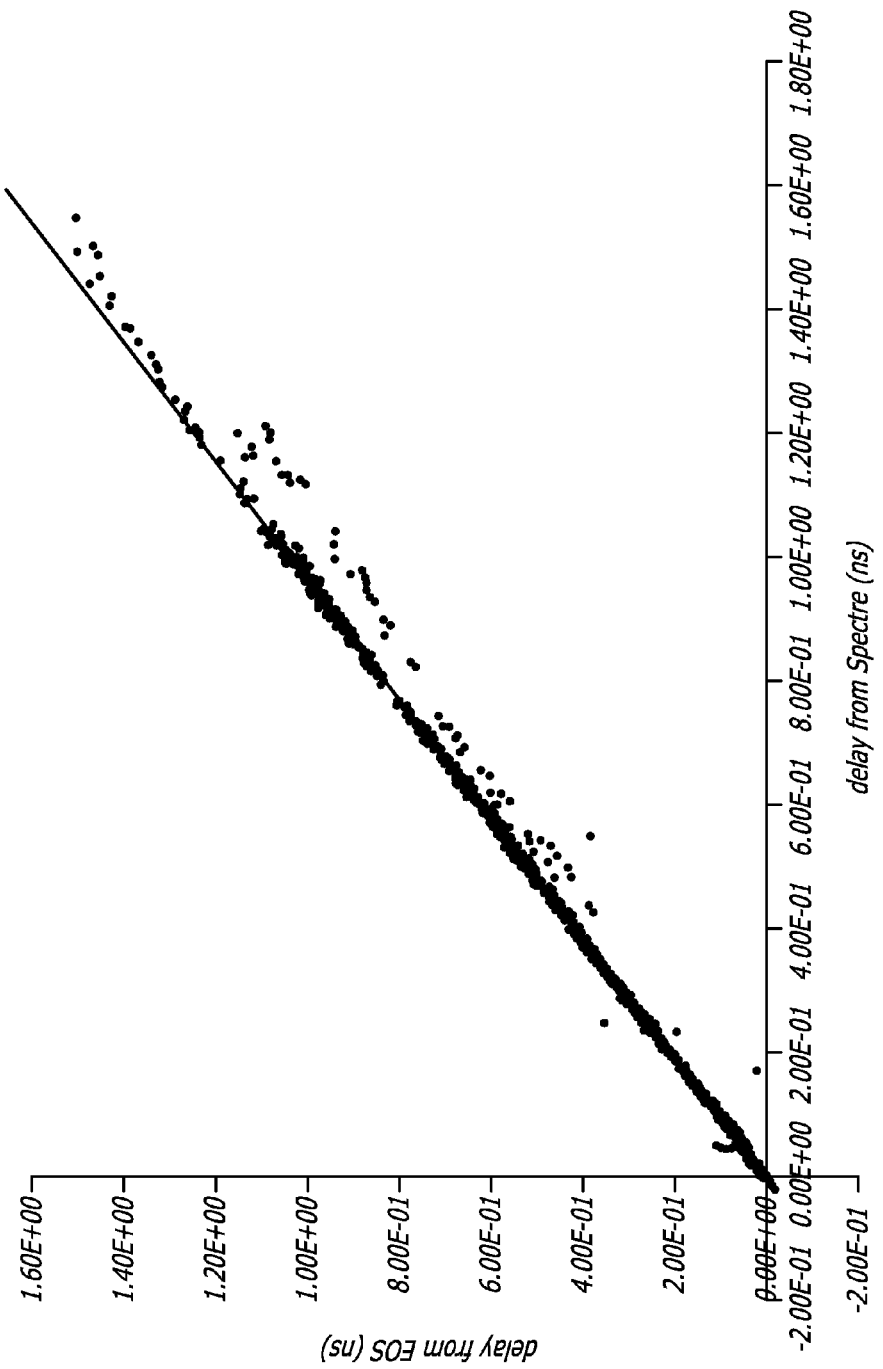
FIG. 8 shows the timing delays obtained from the static analyzer using the multi-CCC current source model in comparison with the spice transistor level circuit simulator.

Referring now to FIG. 8, a plot of timing delays calculated with the delay calculator (EOS) versus those simulated with a spice transistor level simulator, such as Spectre simulator by Cadence Design Systems, Inc., is illustrated. A forty-five degree line illustrating a perfect match is also drawn to see how well the static timing results match that of the transistor level simulated results. As shown in FIG. 8, the timing delay determined using delay calculator (EOS) with a multi-CCC current source model substantially matches the timing delay simulated by the Spectre transistor level simulator in most cases.

While the output results of the static timing analysis may be substantially similar, there may be other cases where a lesser level of accuracy may be acceptable. Depending on the usage scenario, different applications may need different levels of accuracy. For example, during cell placement, we may want to perform delay calculations using lookup models without considering any signal integrity issue. However during sign-off of an integrated circuit design for manufacture, it may be desirable to calculate the timing delays with noise effects using the fully extracted parasitics. For some critical paths, the most accurate delay calculations may be desirable with results substantially similar to that achieved using a SPICE transistor level simulation. The software infrastructure of static timing analyzer EOS with the multi-CCC current source model can support such different usage scenarios.

Concurrent Crosstalk Noise and Delay Calculations

With smaller geometries and larger numbers of switching transistors and gates in integrated circuits, accurate and efficient calculation of delay and crosstalk effects has become more important in the design of integrate circuits.

Crosstalk noise may be analyzed concurrently with timing delays by modeling the noise effects using a current source. This additional current source, along with a voltage dependent current source modeling a switching or static driver of the victim net and reduced-order model for the interconnect, allows for an efficient calculation of noisy transitions and noise glitches on the victim nets. In this manner, multi-CCC current source models may be used to model noise and timing delays.

U.S. Pat. No. 7,359,843 issued on Apr. 15, 2008 to inventors Igor Keller, et al., entitled ROBUST CALCULATION OF CROSSTALK DELAY CHANGE IN INTEGRATED CIRCUIT DESIGN and incorporated herein by reference, introduces sources of noise in a circuit and one method of analyzing the noise aggressors therein. However, it is desirable to concurrently compute timing delays and other noise effects in a circuit due to noise sources such as crosstalk noise from noise aggressors.

Delay calculations in the presence of crosstalk noise may be made analyzed stage by stage on each stage of an integrated circuit design during static timing analysis (STA). A stage is a subcircuit of an integrated circuit design consisting of victim its aggressor and their corresponding driving gates.

Generally, computations for calculation of noise and delay in each stage are performed using current models. A victim normal response of each stage is determined without noise. A current response of each aggressor on victim driver pin is separately (independently) computed. The transition of victim driver with impact from all aggressors is computed. A perturbation method may be used to simplify the computation of changes due to the effect of victim on aggressors. While the perturbation method assumes that the back impact on aggressor transitions is small, it allows one to formulate and easily solve a separate problem for correction to the aggressor transition. Moreover, the perturbation method can provide similar accuracy to computations made using non-linear driver elements for all the drivers with much lower computational cost.

FIG. 2A illustrates a schematic diagram of an exemplary standard cell in a netlist, such as for a subcircuit stage. The standard cell for the subcircuit stage includes a victim driver 130, an aggressor driver 233, and a victim net and an aggressor net forming the RC interconnect network 132, also referred to as a netcomplex (NC), connected to the output of the drivers 130,230. The RC interconnect network 132 may include one or more resistors 210-211 and one or more capacitors 221-224 coupled together. The victim net is the net where delay is calculated. The aggressor net is a net coupled to a victim via capacitance, such as capacitors 223-224. One or more victim receivers 138 are coupled to the output net Vo 201 and may add to the extracted parasitics 136. While the victim receiving gates are typically not included as part of the stage, their parasitic effect on delay may be modeled using gate capacitance.

While the aggressor driver 233 and its aggressor net may be the primary or first order aggressor, a second order aggressor (SOA) may exist including a second order aggressor driver and a second order aggressor net coupled to the first order aggressor. An extended NC (ENC) is a RC network consisting of NC and SOA's. It can be assumed that SOA's are quiet and therefore the aggressor driver of an SOA may be modeled by a holding resistor and a pin capacitor.

Electrically, each stage consists of an extended netcomplex (ENC) around the victim, with current sources modeling victim and aggressors drivers, and load models modeling one or more receiving gates (in the form of capacitors that can be included into ENC).

The RC interconnect network 132 can be modeled by a reduced-order model (ROM) for interconnect. U.S. Pat. No. 7,359,843 issued on Apr. 15, 2008 to inventors Igor Keller, et al., entitled ROBUST CALCULATION OF CROSSTALK DELAY CHANGE IN INTEGRATED CIRCUIT DESIGN, previously incorporated by reference, generally describes how the interconnect with an aggressor may be modeled with a reduced order model.

Referring to FIG. 2B, the aggressor driver 233 may generate an aggressor signal 250 coupled into the interconnect network 132. An aggressor receiver 238 shown in FIG. 2A may also influence the generation of the aggressor signal 250, adding additional parasitic load to the network 132.

A transition in a signal may be defined as a voltage wave starting at a high voltage (e.g., Vdd) and ending at a low voltage level (e.g., zero volts) or vice-versa An input transition is a transition at the input of a stage's driver. It is an input to the delay calculation flow and is provided to the delay calculator. A driver output transition is a transition at an output of the victim driver 130 of the victim net or the aggressor driver 233 of the aggressor net. A stage output transition is a transition at an input to a receiving gate 138 of the stage (a tap of the victim net).

The effect of a switching aggressor on a victim is proportional to the slew rate of transition of on the aggressor. In one embodiment for example, rising edge slew rate may be defined as time required for a rising signal to transition from 20% of supply voltage (Vdd) to 80% of Vdd, and then divided by 0.6. The falling edge slew rate may be defined for example as the time required for a falling signal to transition from 80% of Vdd to 20% of Vdd, which is then divided by 0.6.

The effect of aggressor's crosstalk onto a victim's steady state or transition times is roughly proportional to signal transition rates (slew rates) on the aggressor's net, that in turn are proportional to effective load seen by the aggressors' drivers. That is, the slew rate on an aggressor depends on the coupling capacitance between the aggressor and the aggressor's neighbors, as well as the strength of drivers holding the aggressor's neighbors (i.e., second-order aggressors). Due to the high ratio of coupling capacitance to ground capacitance of wires in modern process nodes, it is important to account for second-order aggressors (aggressors of aggressors of a victim) when calculating crosstalk effects on the victim net.

Neglecting (decoupling) the second-order aggressors effectively increases the load. Depending on the magnitude of the coupling capacitance between an aggressor and its aggressors, the error of slew rate due to such decoupling can be significant. Thus, second order aggressors may be accounted for when determining aggressor slew rate.

A first order aggressor is an aggressor net that has a significant crosstalk influence on a given victim net. A second order aggressor is an aggressor net that has significant influence upon a transition waveform (or slew rate) on a first order aggressor of the given victim net. It is possible that an aggressor net may serve as both a first order aggressor and a second order aggressor relative to a given victim net. The consideration of second order aggressor effects can contribute to more accurate delay change analysis.

Generally, noise effects and timing delay of a circuit stage may be concurrently computed for static timing analysis of integrated circuit designs by using the multi-CCC current source model. The incremental current source that may be added by each aggressor driver to the multi-CCC model of the victim driver is computed separately. The independent results from each aggressor driver may be aligned together to compute the transition in the signal on the output of the victim driver due to the impact from all the aggressor drivers. A perturbation method may then be used to compute the changes in the timing delay of the victim driver when switching due to the combined noise effects of all the aggressor drivers for the circuit stage.

Crosstalk analysis includes glitch calculations as well as calculations of the effects of crosstalk noise on timing delay of a circuit. The approach to crosstalk analysis undertaken herein is different from other approaches in that (i) it is based on a unified analysis infrastructure, used for both base delay calculations and crosstalk analysis; (ii) it is based on a mathematically more rigorous formulation; and (iii) it is more efficient since it may use perturbation methods to find a response (or transition) in the presence of weak noise.

Crosstalk analysis is performed on a circuit stage which is a (usually small) part of a digital circuit consisting of a victim net and one or more aggressor nets coupled via capacitance to the victim net and their corresponding driving gates (victim driver and aggressor drivers). The receiving gates coupled to the victim net are typically not considered to be part of the circuit stage, but their parasitic effects on delay of the output of the circuit stage may be modeled using gate capacitance.

Transitions on the aggressor nets affects a victim net in two situations: (i) when the victim driver is at a steady state, transitions on aggressors generate a glitch which can propagate further on and cause a logical failure in a sampling flip-flop (FF); and (ii) when the victim driver is transitioning, the switching aggressor drivers may speed up or slow down the victim net transition potentially causing a timing violation at the output of the circuit stage.

In the framework of static crosstalk/timing analysis, a worst-case configuration is sought in the circuit stage for which the crosstalk effect is a maximum under certain constraints. The constraints are switching windows (SW) or timing windows for victim driver input transitions and aggressor driver input transitions and the logical relationships between aggressor nets and victim nets. This gives rise to a couple of complexity factors in a crosstalk analysis of the circuit stage: (i) that the worst-case alignment between victim and aggressor transitions is not known in advance and may be found through a multi-dimensional nonlinear optimization; (ii) that for each optimization step, a solution of a set of ordinary differential equations (ODEs) is to be determined for the sub-circuit stage. The set of ordinary differential equations (ODEs) to be solved may be large as it includes the coupled RC networks for the victim net and aggressor nets and their respective driver cells.

Exemplary optimization methods to align victim and aggressor transitions are described in U.S. Pat. No. 7,359,843 issued on Apr. 15, 2008 to inventors Igor Keller, et al., entitled ROBUST CALCULATION OF CROSSTALK DELAY CHANGE IN INTEGRATED CIRCUIT DESIGN, previously incorporated by reference.

For example, a constrained optimization process may be employed to efficiently identify worst-case (WC) aggressor alignment. The process employs an algorithm that iterates over aggressor alignments in a search of the WC delay change based on a metric. This is done separately for each receiver connected to a victim net, since the type of receiver and its load affect the WC alignment and delay change.

Basically, the process involves nonlinear optimization with constrains (i.e., switching windows) to find the WC alignment between victim and aggressors transitions, and consequently delay change on the receivers input.

Constraints are given for each aggressor in the form of switching window (SW), calculated by a timer tool for example. Each aggressor can switch within its switching window. The goal of the optimization process is to identify aggressor alignment that maximizes delay change due to the switching aggressors. WC max delay change represents the maximum pushout of late (noiseless) transition on outputs of victim stage due to aggressors switching in opposite direction to that of victim. WC min delay change represents the maximum pull-in of early (noiseless) transition on the outputs of victim stage to due aggressor switching in the same direction as the victim. As used herein, the terms "max delay" and "min delay" denote delay of, respectively, late and early transitions.

The constrained optimization process uses a two-step greedy algorithm. It is assumed that there are N respective (logically independent) aggressors able to switch within respective switching windows $[T_{1j}, T_{2j}]$. Ordinarily, N is between 1 and 10. Transitions on aggressor nets are assumed to be monotonic (rising or falling) functions of time. It can be proven that current response on victim's driver output to such monotonic transition on an aggressor is a unimodal (having a single peak) wave.

In order to describe the optimization method, a delay change curve may be used to plot the delay change as a function of alignment for min delay analysis, and "minus" (negated) delay change as function of alignment for max delay analysis. This way in both min and max delay analyses the delay change curve is of similar topology, and the optimization of alignment is formulated as finding of minimum of the delay change curve.

To concurrently analyze noise and delay, the delay/SI calculator 102 in FIG. 1A works on a net level abstraction. It deals with computing the signal propagation delay through each edge or timing arc of a design or timing graph. Typically, the computation is performed for a set of related edges, where all the edges are formed based on a cell driving a net. The set of related edges is often referred to as a stage. The delay/SI calculator creates an electrical view of a stage and then computes all required electrical calculations on this stage by performing appropriate electrical simulations. A computational model is formed that allows for the calculation of delay including crosstalk effects.

Generally, the circuit stage may be described by the following set of ordinary differential equations (commonly referred to as a state-space system) allowing one to calculate voltage waveforms on all nodes of interest (particularly the outputs of the circuit stage coupled to the receiver input pins) as follows:

$$E\frac{dx}{dt} = Ax + Bu \qquad (29)$$

$$v = Cx \qquad (30)$$

In this set of state space equations, Eqs. (29) and (30), x is the vector of states for the circuit stage; A, E, B, C are state space matrices formed during resistor-capacitor (RC) interconnect network reduction (ROM generation); v is a vector of voltages at the taps (inputs to the final receivers of the stage) and ports (outputs of drivers of the stage); and u is a vector of current sources at the inputs of the circuit stage to model the victim driver and/or the aggressor driver. The state space equation system describes port and tap voltage responses v to nonlinear current source(s) u connected at port(s) of the RC network.

In general the nonlinear current sources attached to each port are nonlinear functions of time and (unknown) voltage at that port: $u_n = I_n(t, v_n)$. Additionally, the current sources used to model the aggressor drivers have an additional parameter which may shift over time, reflecting the fact that transition at aggressor input can occur within certain timing or switching windows (SW). The current source for the $k^{th}$ aggressor is described by the equation $u_k = I_k(t - \tau_k, v_k)$, where k is the shift parameter for the $k^{th}$ aggressor.

Calculation of the voltages on the terminals (ports and taps) of the circuit stage may be performed by a numerical integration of state space equations Eqs. (29) and (30) which can be very expensive. However, due to the special structure of the matrices A and E, a perturbation method may be used to solve the state space equations more efficiently to determine the voltages.

The general idea of the perturbation method is separation the original problem into several simpler problems, which can be solved much more efficiently with little or no loss of accuracy. In the particular, the application of the original problem of calculating a response to simultaneous transitions of victim and aggressor nets is separated into two (or more) simpler problems.

The first problem describes a transition on only the victim net to calculate a base delay with the aggressor nets being quiet. The noiseless responses and corresponding delays can therefore be determined from the first problem which is much simpler and easier to solve than the original problem.

The crosstalk effects, which are considered to be perturbations of the noiseless solution, are determined from the second problem which models the switching aggressors. The second problem provides for crosstalk-induced adjustment to the noiseless solution found from the first problem.

At a high-level of description, the perturbation method is based on a mathematical expansion of unknown quantities in a series, such as:

$$x = x^{(0)} + x^{(1)} + \ldots \qquad (31)$$

$$v = v^{(0)} + v^{(1)} + \ldots \qquad (32)$$

Eq. 31 for the vector of states x and Eq. 32 for the vector of voltages v at ports and taps, respectively.

The system of state space equations Eqs. (29) and (30) are also expanded in series, yielding a set of problems to be solved sequentially. As described above, the expansion of the original problem is carried out in such a way such that the first problem describes a noiseless situation, where aggressor drivers are quiet, and the crosstalk effects are obtained from the second problem. Accordingly, the excitation vector u may be expanded as well as follows:

$$u = u^{(0)} + u^{(1)} + \ldots \quad (33)$$

In the expansion of the excitation vector u, the first term $u^{(0)}$ is the excitation vector for the first problem, containing only the current source for the victim driver. The second term $u^{(1)}$ in the expansion of the excitation vector includes current sources modeling the aggressor drivers as well as a correction current through the victim driver due to crosstalk effects as follows.

In this manner, using the perturbation approach to solving the equations, the effect of crosstalk on victim transitions is initially computed separately for each aggressor, and then linearly or nonlinearly combined with the noiseless transition (solution of the first problem). or the base solution. The corrections to the solutions of the state space equations due to non-linear interactions between the victim and aggressors drivers may be found from the high-order problems formulated using the next terms in the expansion, similar to the expansion of terms shown by Eqs. (31),(32), and (33).

The arrival time (AT) of a transition is a time determined by an arrival time (AT) functional, which is defined over the space of transitions $w(t) \in W : R \to [0, Vdd]$, so $J : W \to R$. We do not assume that a transition is a monotonic function of time but assume it is constant outside some range $[t_1, t_2]$.

The conventional definition of arrival time is a time point where the transition crosses $V_{ref}$ (usually 0.5 Vdd), which can be expressed through a functional as $$J[w(t)] = \int_{-\infty}^{\infty} t \delta(w(t) - V_{ref}) dt \quad (34)$$

Timing delay D is the difference in arrival times (ATs) of a circuits stage's output and input transitions which can be expressed as:

$$D = J[w_o(t)] - J[w_i(t)]. \quad (35)$$

Generally, the AT functionals at the input and output nodes of a stage can be different.

Min delay (max delay) is the minimal (maximal) delay for a given input and output of a stage, over all possible arrival times ATs at aggressor driver inputs under certain constraints. The constraints are timing windows or switching windows at inputs of aggressor drivers.

Process variations, no crosstalk

Assume a victim net has no coupling capacitance but parameters of interconnect and driver can vary within a (relatively) small range. We apply perturbation methods onto the driver model.

Let $\lambda = \{\lambda_n\}$, $n=1,\ldots,N$ and $\kappa = \{\kappa_n\}$, $n=1,\ldots,J$ be vectors of interconnect and gate process parameter variations, respectively. Assuming the parameterized gate current model, $I(t,v,\kappa)$, and driving-point admittance, $Y(s,\lambda)$, are known, applying Kirchhoff's Current Law (KCL) on the driver output node we find $$L^{-1}\{YX\} = I(t, x(t), \kappa), \quad (36)$$

Here x(t) denotes voltage response on the driver-output node and X is its Laplace transform.

A perturbation method can now be used by introducing a small parameter $\epsilon$ and assuming the variations are proportional to it. We further expand Y,x,I into series of $\epsilon$:

$$Y = Y^{(0)} + \epsilon Y^{(1)} + \ldots$$

$$I = I^{(0)} + \epsilon I^{(1)} + \ldots$$

$$x = x^{(0)} + \epsilon x^{(1)} + \ldots \quad (37)$$

Here $I^{(0)} = I(t, x(t), 0)$, etc.

At the leading order we have KCL for the nominal response (all variations are zero):

$$L^{-1}\{Y^{(0)} X^{(0)}\} = I^{(0)}. \quad (38)$$

As the above equation is nonlinear, it will be solved numerically.

For the next order we find $$L^{-1}\{Y^{(0)} X^{(1)}\} = I^{(1)} - L^{-1}\{Y^{(1)} X^{(0)}\}. \quad (39)$$

The correction to the driver current denoted by $I^{(1)}$ has two components due respectively to (i) the dependency on output voltage and (ii) the process variation and can be expressed as follows:

$$I^{(1)} = g(t) x^{(1)} + i \cdot K. \quad (40)$$

In Eq. (40), $g(t) = dI(t,v,0)/dv|_{v=x^{(0)}}$ is a small-signal admittance of the driver, and $i_k(t) = dI(t,x,\kappa)/d\kappa_k|_{\kappa=0}$, $K = \epsilon^{-1}\kappa$ are sensitivities of current model and normalized vector of variations, respectively.

In finding a solution of Eq. (40), $x^{(1)}$ is in fact a product of the vector of sensitivities and the vector of normalized variations:

$$x^{(1)} = \sum_{n=1}^{N} \Lambda_n x_n^{(1)} + \sum_{n=N+1}^{N+J} K_n x_n^{(1)}. \quad (41)$$

Here $\{\Lambda_j\} = \{\Lambda_j / \epsilon\}$ is the vector of normalized interconnect process parameters and $\{x_k^{(1)}\}$ is the vector of sensitivities of the response with respect to (w.r.t.) interconnect and gate process variations.

Eq. (39) is linear but time-variant with respect to (w.r.t.) $x^{(1)}$ due to g(t) in Eq. (40).

In order to find the $x^{(1)}$ it needs to be integrated numerically for each of the sensitivities $x_k^{(1)}$, which can be costly. Alternatively, we can apply a perturbation method in this case to the time-varying gate admittance by separating it into a constant and (small) time-dependent parts:

$$g(t) = g_0 + g_1(t) \quad (42)$$

We seek the sensitivities as a sum of two components, corresponding to constant and time-varying parts of g(t), respectively:

$$X^{(1)} = \overline{X}^{(1)} + \tilde{X}^{(1)}, \quad (43)$$

We assume the correction to driver-point admittance is represented by a linear form of interconnect parameters, $$Y^{(1)} = \sum_{n=1}^{N} \Lambda_n Y_n^{(1)} \quad (44)$$

and then include $g_0$ into a modified driving point admittance, $\hat{Y} = Y^{(0)} + g_0$, to obtain a set of equations for the sensitivities:

$$\hat{Y} \overline{X}_n^{(1)} = -Y_n^{(1)} X^{(0)}, n=1,\ldots,N, \quad (45)$$

$$\hat{Y} \overline{X}_n^{(1)} = L^{-1}\{i_n(t)\}, n=N+1,\ldots,N+J. \quad (46)$$

Each $\overline{x}_n^{(1)}$ can be found using two recursive convolutions.

The second part of the sensitivity, the one due to the time-dependent component of the driver admittance, is found from $$\tilde{Y}\tilde{X}_n^{(1)} = -L\{g_1(t)\bar{x}_n^{(1)}\}, n=1, \ldots, N+J. \quad (47)$$

This requires another recursive convolution.

After this is done, the sensitivities of the driver-output response with respect to n-th process parameter variation is found as $\bar{x}_n^{(1)} + \tilde{x}_n^{(1)}$.

Apparently, if an impedance formulation is used, the computational cost can be lower. In addition, there are reasons to believe that computation of impedance Z instead of admittance Y can be faster (since M by N arithmetic (MNA) matrices ma be smaller) and numerically more stable.

The term $g_0$ is introduced into the macromodel and the driving point impedance Z can be found.

The above steps are modified as follows. The zero-order response is found from the nonlinear equation $$\overline{X}^{(0)} = ZL\{I^{(1)} - g_0 x^{(0)}\}, \quad (48)$$

The sensitivities $x_n^{(1)} = \bar{x}_n^{(1)} + \tilde{x}_n^{(1)}$ are then found in two steps, first $$\overline{X}_n^{(1)} = -ZY_n^{(1)} X^{(0)}, n=1, \ldots, N, \quad (49)$$

$$\overline{X}_n^{(1)} = ZL^{-1}\{i_n(t)\}, n=N+1, \ldots, N+J. \quad (50)$$

and then $$\tilde{X}_n^{(1)} = -ZL\{g_1(t) x_n^{(0)}\}, n=1, \ldots, N+J. \quad (51)$$

Details on explicit and implicit FTD procedure

Here we describe details of digital Fourier transform (FTD) procedure applied to two types of equations. First, consider the explicit FTD (fêted) which allows us to find v(t) from the equation $$V(s) = H(s)W(s). \quad (52)$$

Here the transfer function (TF) H(s) is given in pole/residue form as $$H(s) = d + sc + \sum_{n=1}^{N} \frac{k_n}{s + p_k} \quad (53)$$

and w(t) is a known piece-wise-linear (PWL) function of time.

In time domain, Eq.(52) has the form $$v(t) = dw + c\dot{w} + \sum_{n=1}^{N} e^{-tp_n} \int_0^t e^{t' p_n} w(t') dt'. \quad (54)$$

Here we assume that the response v=0 at t=0. We further assume that w(t) has break points at equal intervals: $t_n = n\tau$. We seek v(t) in the form of PWL function at same break points. Discritization of terms in the right hand side (r.h.s.) of Eq. (54) leads to recursive relation $$v_n = Av_{n-1} + Bw_n + Cw_{n-1}. \quad (55)$$

Delay calculation for fixed input transitions

A delay calculation may be made in the case where input transitions are fixed (having known arrival times).

For state-space formulation we introduce a vector of voltages at the nodes of the ENC, x, and enumerate them in such a way that $x_0$ denotes voltage on the victim driver output, $x_1, \ldots, x_P$ are voltages on aggressor driver outputs, and $x_{P+1}, \ldots, x_{P+N}$ are probing points (taps) that are receiver inputs (P number of aggressors, N is number of receivers).

Let $\{H_{p,kk}, Y_{p,k}\}$ be, respectively, port-to-tap transfer functions and port-to-port admittances described by a macromodel for the ENC, the set of KCL equations for victim and P aggressor ports (driver output nodes) of the NC reads $$L^{-1}\left\{Y_{0,0} X_0 + \sum_{p=1}^{P} Y_{0,p} X_p\right\} = I_0(t, x_0(t)), \quad (56)$$

$$L^{-1}\left\{Y_{k,k} X_k + \sum_{p \neq k}^{P} Y_{k,p} X_p\right\} = I_k(t, x_k(t)), k=1, \ldots, P \quad (57)$$

Here $X_k(s) = L[x_k(t)]$ and $L[\cdot]$ is the Laplace transform. The current sources in the r.h.s. of the Eqs. (56), (57) describe currents drawn by correspondent driving gates excited by respective input transitions. Note that this is not an approximation—any switching gate can be modeled using some nonlinear time-dependent voltage-controlled current source.

From the Eqs. (56), (57) one can determine transitions on all the ports, and then find stage output transitions using the transfer function:

$$x_n(t) = L^{-1}\left\{\sum_{p=0}^{P} H_{n,p} X_p\right\}, n = P+1, \ldots, P+N \quad (58)$$

Once the output responses (transitions) are found, correspondent ATs are calculated using arrival time (AT) functions.

Assuming the input transitions to the stage are known, the problem of delay calculation is equivalent to the problem of finding transitions on all taps.

The delay calculation flow has the following steps:
Construct current sources $I_p(t, x_p)$ for each driving gate using its correspondent input transition
Find {H,Y} (or macromodel) for ENC
Solve nonlinear set of equations Eqs. (56), (57) for port responses
Find tap transitions from Eq. (58)
Find AT and delay using a correspondent AT functionals
Calculation of min and max delays The method described previously allows one to find delay for a set of input transitions with known or fixed arrival times (AT's). More precisely, it assumed that the offsets of ATs on all aggressor driver inputs relative to that of victim driver input transition are known (fixed). In general, the aggressor transitions can arrive within a certain window relatively to the victim input transition. Such a window is called a timing window or a switching window and it is known at the time the delay calculation is performed.

Accordingly, the goal of delay calculation in the context of STA is to find the min and max delays on the stage. The delay calculation (for given input-output transition pair) is, therefore, an optimization problem consisting of two parts: (i) selection of a worst-case (WC) side-input vector among all possible ones allowing the specific direction of transitions on input and output of the stage, and (ii) finding a WC alignment of aggressor ATs under timing window constraints.

In the case there exists more than one side-input vector allowing the needed input and output transitions, we will need to find delay for all (or almost all) of them. But there are very few gates with more than one side-input vector, so this should not be a problem from the run time point of view. In addition, a set of heuristics can be used to filter some of the vectors to simplify calculations.

For a selected side-input vector (if there are more than one) the problem of calculating the max delay on tap n, $T_{max,n}$ is equivalent to finding a maximal AT there among all possible ATs of aggressor input transitions relative to that of a victim:

$$L^{-1}\left\{Y_{0,0}X_0 + \sum_{p=1}^{P} Y_{0,p}X_p\right\} = I_0(t, x_0(t)), \quad (59)$$

$$L^{-1}\left\{Y_{k,k}X_k + \sum_{p\neq k}^{P} Y_{k,p}X_p\right\} = I_k(t-\tau_k, x_k(t)), k=1,\ldots,P, \quad (60)$$

$$T_{max,n} = \max_{\xi_k^{(l)} < \tau_k < \xi_k^{(r)}} J_n[x_n(t)], n = P+1, \ldots, N+P \quad (61)$$

Here $\xi_k^{(l)}, \xi_k^{(r)}$ are, respectively, left and right boundaries of arrival time at k-th aggressor driver input, and $J_n$ is the AT functional at the n-th tap.

Calculation of min delay is similar to that of max delay with minimum used instead of maximum.

Perturbation method

The calculation of max delay involves an optimization procedure, on each iteration for which a solution of a nonlinear set of differential equations is desired to be found. Clearly, such calculation would be too expensive for practical purposes.

In what follows we apply perturbation technique to reduce the computational cost of the delay calculation algorithm described above.

First, probably the largest past of the computational cost is calculation of a macromodel for the ENC. Indeed, such a network can potentially consist of tens of nets (assuming there are 3-5 aggressors each having 3-5 aggressors). It is therefore necessary to reduce the size of the RC network by using RC reduction techniques.

Second, we will show that a very significant part of the delay calculation is common for each alignment vector, and it can be done once.

To address the first issue we approximate transfer functions for the stage's ENC, $Y_{k,p}, H_{k,p}$, these being found from a much smaller NC Such simplification is possible primarily due to the fact that usually self-admittance is much larger than trans-admittances, and in addition, effects of switching net coupled to another net through two layers of capacitors is usually negligible.

The second part of the simplification is actually the perturbation procedure. First we assume that transitions on aggressor ports can be sought as perturbations of some precomputed transitions:

$$x_p = \tilde{x}_p + x'_p, p=1,\ldots,P. \quad (62)$$

Here $\tilde{x}_p$ is the transition on port p which is found from the following KCL equation:

$$L^{-1}\{\tilde{Y}_{p,p}\tilde{X}_p\} = I_p(t, \tilde{x}_p(t)), p=0,\ldots,P. \quad (63)$$

The self-admittance $\tilde{Y}_{p,p}$ in the above equation is computed from an NC around the p-th aggressor with holding conductors attached to the other ports.

At the leading order the response at the victim driver output is found from $$L^{-1}\{\hat{Y}_{0,0}X_0\} - I_0(t, x_0(t)) = \sum_{p=1}^{P} \hat{i}_p(t - \tau_p) \quad (64)$$

Here $\hat{Y}_{0,0}$ is the self-admittance of victim-centric NC with all the secondary ports shorted to ground; the currents on the r.h.s. of the equation are given by $$\hat{i}_p(t) = \hat{Y}_{0,p}\tilde{X}_p. \quad (65)$$

Note that the correct responses need to be computed only once since they are independent of the time shift.

Eq. (60) describes a response in the case of voltage sources attached to the secondary ports. These voltage sources have, naturally, infinite admittance which is not true in practice. In fact this may not accurate enough since the back-impact of victim's transition on aggressor drivers, as well as mutual influence of aggressor transitions is neglected at this order.

To resolve this problem we expand the current sources $I_p(t,x_p)$ around the nonperturbed transitions $I_p(t,x_p) = I_p(t,\tilde{x}_p) + g_p(t)x'_p$, where $g_p(t) = dI_p(t,z)/dz|_{z=\tilde{x}_p}$ and introduce this into Eq. (60):

$$\tilde{Y}_{p,p}X'_p - L\{g_p(t)x'_p\} = -\hat{Y}_{p,0}X_0 - \sum_{\substack{k=1 \\ k\neq p}}^{P} \hat{Y}_{p,k}\tilde{X}_k. p=1,\ldots,P \quad (66)$$

Here $X'_p = L\{x'_p\}$. We then represent the time-dependent conductance $g_p(t)$ as sum of a constant finite and time-dependent small parts: $g_p(t) = \bar{g}_p + g'_p(t)$. Since the term $g_p(t)x'_p$ is small compared to others, it can be pushed to the next order. At this order the equations governing the corrections to aggressor output responses $\tilde{X}_p$ read:

$$(\tilde{Y}_{p,p} - \bar{g}_p)X'_p = -\hat{Y}_{p,0}X_0 - \sum_{\substack{k=1 \\ k\neq p}}^{P} \hat{Y}_{p,k}\tilde{X}_k. \quad (67)$$

Note, that here we omitted the term $L\{g_p(t)x'_p\}$ but it will be accounted for in the next order. Also, note that there is yet an unknown response at the victim driver output, $X_0$, in the r.h.s. of the equation.

The corrections to leading-order transitions on aggressor driver outputs translate into a correction to current injected at the victim driver output node in the r.h.s. of Eq. (64).

$$L^{-1}\{\hat{Y}_{0,0}X_0\} - I_0(t, x_0(t)) = \sum_{p=1}^{P} [\hat{i}_p(t-\tau_p) + \hat{i}'_p(t-\tau_p)] \quad (68)$$

$$\hat{i}'_p(t) = \hat{Y}_{0,p}\tilde{X}'_p. \quad (69)$$

However, it can be shown that the corrections do not need to be calculated explicitly if instead of $\hat{Y}_{p,k}$ we use $\tilde{Y}_{p,k}$ which is found from the same victim-centric NC but with $g'_n$ attached to the aggressor ports.

The KLC equation for the victim driver output node then has the following form:

$$L^{-1}\{\tilde{Y}_{0,0}X_0\} - I_0(t, x_0(t)) = \sum_{p=1}^{P} \tilde{i}_p(t - \tau_p) \quad (70)$$

$$\tilde{i}'_p(t) = \tilde{Y}_{0,p}\tilde{X}_p. \quad (71)$$

$$x_n(t) = L^{-1}\left\{\sum_{p=0}^{P} \tilde{H}_{n,p}\tilde{X}_p\right\}, n = P+1, \ldots, P+N \quad (72)$$

This algorithm can be summarized in following steps:

Compute transitions $\tilde{X}_p$ on each aggressor driver output using self-admittance $\tilde{Y}_{p,p}$ found from a modified NC around that aggressor (by adding conductors on other ports)

Find $\{\tilde{H}_{p,k}, \tilde{Y}_{p,k}\}$ from the modified NC around victim (with constant conductors added to all secondary ports)

Compute current responses from each aggressor to the victim port $\tilde{i}_p(t) = \tilde{Y}_{0,p}\tilde{X}_p$ and voltage responses at taps $\tilde{v}_{n,p}(t) = \tilde{H}_{n,p}\tilde{X}_p$ Select a vector of offsets $\{\tau_p\}$ and find the combined current responses (r.h.s. of Eq. (66))

Solve the nonlinear equation Eq. (64),(70) for victim driver output response calculation Find tap transitions from Eq. (63) with shifted voltage responses Find arrival time AT and delay using a correspondent arrival time (AT) functionals Repeat the preceding steps until worst arrival time is found In the described method, a macromodel for NC's of all nets (victim and aggressor) is formed with all secondary ports having a conductor attached. Therefore, no (expensive) rank-1 update is needed Second-order correction In order to account for the time-dependent part of the driver impedance, $g'_p(t)$ (which in most cases is negligible), we can compute an additional correction to the current $\hat{I}_p(t)$.

CONCLUSION

The concurrent calculation of noise effects and timing delay for a circuit stage within an integrated circuit disclosed herein can provide a more efficient static timing analysis.

When implemented in software, the elements of the embodiments of the invention are essentially the code segments to perform the necessary tasks. The program or code segments can be stored in a processor readable medium that can be read and executed by a processor. The processor readable medium may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, and a magnetic disk. The program or code segments may be downloaded via computer networks such as the Internet, Intranet, etc and stored in the processor readable medium. When implemented as a system, the elements of the embodiments of the invention include a processor to execute the program or code segments that may be stored in a processor readable medium to perform the tasks or functions of a method or process.

The embodiments of the invention are thus described. While embodiments of the invention have been particularly described, they should not be construed as limited by such embodiments. Instead, the embodiments of the invention should be construed according to the claims that follow below.

What is claimed is:

1. A method of static timing analysis for an integrated circuit design in the presence of noise, the method comprising:
    partitioning an integrated circuit design into a plurality of subcircuit stages;
    modeling each subcircuit stage of the integrated circuit design with a model of at least one victim driver, at least one aggressor driver, at least one receiver, and an interconnect network of at least one victim net and at least one aggressor net coupled together, wherein each subcircuit stage of the integrated circuit design includes a set of related edges of a design graph to compute signal propagation delay;
    for each subcircuit stage, concurrently computing full timing delays for each edge of the design graph, including concurrently computing base timing delays for a nominal response to the at least one victim driver and the interconnect network and noise related timing delays in response to the at least one aggressor driver and the interconnect network; and
    wherein one or more of the partitioning, the modeling, and the concurrent computing are automatically performed with a processor.

2. The method of claim 1, wherein
    the base timing delays are computed for the nominal response to a victim transition of the at least one victim driver and the interconnect network for each edge without cross-talk noise from any aggressor driver.

3. The method of claim 2, wherein
    the full timing delays are computed by
        independently computing a glitch response of each circuit stage for each aggressor driver at an input to the at least one receiver in response to an aggressor transition of the respective aggressor driver;
        optimizing alignment of the victim transition and the aggressor transitions in each stage to determine a worse case aggressor alignment for worst case delay change; and
        combining all of the glitch responses together with the nominal response to determine the full timing delay of each subcircuit stage.

4. The method of claim 3, wherein
    the combining of all of the glitch responses together with the nominal response is performed by using a perturbation method.

5. The method of claim 1, further comprising:
    tabulating the nominal response, the glitch responses and the full timing delays of each circuit stage for use in static timing analysis of the integrated circuit design.

6. The method of claim 1, wherein
    the at least one victim driver and the at least one aggressor driver are each modeled by a multi-CCC current source model.

7. The method of claim 1, wherein
    the modeling of each subcircuit stage of the integrated circuit design includes
        identifying the at least one victim driver, the at least one aggressor driver, and the at least one receiver coupled to the at least one victim net and the at least one aggressor net; and coupling parasitic resistances and capacitances to the at least one victim driver, the at least one aggressor driver, and the at least one receiver to model the at least one victim net and the at least one aggressor net.

8. The method of claim 7, wherein
the modeling of each subcircuit stage of the integrated circuit design further includes
determining an input capacitance of the at least one receiver to model the at least one receiver.

9. The method of claim 8, wherein
the modeling of each subcircuit stage of the integrated circuit design further includes
reading a cell library file to determine a gate model for each of the at least one victim driver and the at least one aggressor driver.

10. The method of claim 9, wherein
the gate model is a multi-CCC current source model.

11. A machine readable product for static timing analysis of an integrated circuit design, the machine readable product comprising:
a non-transitory machine readable medium having machine readable program code stored therein including
machine readable program code to automatically partition an integrated circuit design into a plurality of subcircuit stages;
machine readable program code to automatically model each subcircuit stage of the integrated circuit design with a model of at least one victim driver, at least one aggressor driver, at least one receiver, and an interconnect network of at least one victim net and at least one aggressor net coupled together, wherein each subcircuit stage of the integrated circuit design includes a set of related edges of a design graph to compute signal propagation delay; and
machine readable program code to automatically concurrently compute full timing delays for each edge of each subcircuit stage, including concurrently computing base timing delays for a nominal response to the at least one victim driver and the interconnect network and noise related timing delays for at least one glitch response to the at least one aggressor driver and the interconnect network.

12. The machine readable product of claim 11, wherein
the base timing delays are automatically computed by the machine readable program code for the nominal response to a victim transition of the at least one victim driver and the interconnect network for each edge without cross-talk noise from any aggressor driver.

13. The machine readable product of claim 11, wherein
the machine readable program code to automatically concurrently compute the full timing delays includes
machine readable program code to automatically independently compute a glitch response of each circuit stage for each aggressor driver at an input to the at least one receiver in response to an aggressor transition of the respective aggressor driver;
machine readable program code to automatically optimize alignment of the victim transition and the aggressor transitions in each stage to determine a worse case aggressor alignment for worst case delay change; and
machine readable program code to automatically combine all of the glitch responses together with the normal response to determine the full timing delay of each subcircuit stage.

14. The machine readable product of claim 13, wherein
the machine readable program code to automatically combine all of the glitch responses together with the normal response uses a perturbation method.

15. The machine readable product of claim 11, wherein
the machine readable program code to automatically concurrently compute model each subcircuit stage of the integrated circuit design includes
machine readable program code to automatically identify the at least one victim driver, the at least one aggressor driver, and the at least one receiver coupled to the at least one victim net and the at least one aggressor net; and
machine readable program code to automatically couple parasitic resistances and capacitances to the at least one victim driver, the at least one aggressor driver, and the at least one receiver to model the at least one victim net and the at least one aggressor net.

16. The machine readable product of claim 15, wherein
the machine readable program code to automatically concurrently compute model each subcircuit stage of the integrated circuit design further includes
machine readable program code to automatically determine an input capacitance of the at least one receiver to model the at least one receiver.

17. The machine readable product of claim 16, wherein
the machine readable program code to automatically concurrently compute model each subcircuit stage of the integrated circuit design includes
machine readable program code to automatically read a cell library file to determine a gate model for each of the at least one victim driver and the at least one aggressor driver.

18. The machine readable product of claim 17, wherein
the gate model is a multi-CCC current source model.

19. A system for static timing analysis of an integrated circuit design, the system comprising:
a processor to execute instructions to perform operations in analyzing timing of an integrated circuit design; and
a storage device coupled to the processor, the storage device to store instructions that when executed by the processor cause the processor to perform operations including
partitioning an integrated circuit design into a plurality of subcircuit stages;
modeling each subcircuit stage of the integrated circuit design with a model of at least one victim driver, at least one aggressor driver, at least one receiver, and an interconnect network of at least one victim net and at least one aggressor net coupled together, wherein each subcircuit stage of the integrated circuit design includes a set of related edges of a design graph to compute signal propagation delay; and
for each subcircuit stage, concurrently computing full timing delays for each edge of the design graph, including concurrently computing base timing delays for a nominal response to the at least one victim driver and the interconnect network and noise related timing delays in response to the at least one aggressor driver and the interconnect network.

20. The system of claim 19, wherein
the base timing delays are computed for the nominal response to a victim transition of the at least one victim driver and the interconnect network for each edge without cross-talk noise from any aggressor driver.

21. The system of claim 20, wherein
the full timing delays are computed by
- independently computing a glitch response of each circuit stage for each aggressor driver at an input to the at least one receiver in response to an aggressor transition of the respective aggressor driver;
- optimizing alignment of the victim transition and the aggressor transitions in each stage to determine a worse case aggressor alignment for worst case delay change; and
- combining all of the glitch responses together with the nominal response to determine the full timing delay of each subcircuit stage.

22. The system of claim 21, wherein
the combining of all of the glitch responses together with the nominal response is performed by using a perturbation method.

23. The system of claim 19, further comprising:
tabulating the nominal response, the glitch responses and the full timing delays of each circuit stage for use in static timing analysis of the integrated circuit design.

24. The system of claim 19, wherein
the at least one victim driver and the at least one aggressor driver are each modeled by a multi-CCC current source model.

25. The system of claim 19, wherein
the modeling of each subcircuit stage of the integrated circuit design includes
- identifying the at least one victim driver, the at least one aggressor driver, and the at least one receiver coupled to the at least one victim net and the at least one aggressor net; and
- coupling parasitic resistances and capacitances to the at least one victim driver, the at least one aggressor driver, and the at least one receiver to model the at least one victim net and the at least one aggressor net.

26. The system of claim 25, wherein
the modeling of each subcircuit stage of the integrated circuit design further includes
- determining an input capacitance of the at least one receiver to model the at least one receiver.

27. The system of claim 26, wherein
the modeling of each subcircuit stage of the integrated circuit design further includes
- reading a cell library file to determine a gate model for each of the at least one victim driver and the at least one aggressor driver.

28. The system of claim 27, wherein
the gate model is a multi-CCC current source model.

* * * * *